United States Patent
McCarthy et al.

(10) Patent No.: US 12,335,530 B2
(45) Date of Patent: Jun. 17, 2025

(54) SEMANTICS FOR CONSTRAINED PROCESSING AND CONFORMANCE TESTING IN VIDEO CODING

(71) Applicant: Dolby Laboratories Licensing Corporation, San Francisco, CA (US)

(72) Inventors: Sean Thomas McCarthy, San Francisco, CA (US); Peng Yin, Ithaca, NY (US); Walter J. Husak, Simi Valley, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 70 days.

(21) Appl. No.: 17/996,207

(22) PCT Filed: Apr. 21, 2021

(86) PCT No.: PCT/US2021/028434
§ 371 (c)(1),
(2) Date: Oct. 13, 2022

(87) PCT Pub. No.: WO2021/216736
PCT Pub. Date: Oct. 28, 2021

(65) Prior Publication Data
US 2023/0199224 A1    Jun. 22, 2023

Related U.S. Application Data

(60) Provisional application No. 63/028,214, filed on May 21, 2020, provisional application No. 63/013,713, (Continued)

(51) Int. Cl.
H04N 19/70    (2014.01)
H04N 19/61    (2014.01)
H04N 19/82    (2014.01)

(52) U.S. Cl.
CPC ............ *H04N 19/70* (2014.11); *H04N 19/61* (2014.11); *H04N 19/82* (2014.11)

(58) Field of Classification Search
CPC ......... H04N 19/61; H04N 19/70; H04N 19/82
See application file for complete search history.

(56) References Cited

U.S. PATENT DOCUMENTS 6,233,356 B1    5/2001    Haskell
2008/0304566 A1    12/2008    Yoon
(Continued)

FOREIGN PATENT DOCUMENTS

WO    20210167758 W    8/2021
WO    20210208899 W    10/2021
WO    20210211364 W    10/2021

OTHER PUBLICATIONS

Bross, Benjamin; Chen, Jianle; Liu, Shan; Wang, Ye-Kui; "Versatile Video Coding (Draft 8)"; Joint Video Experts Team (JVET) of ITU-T SG 16 QP 3 and ISO/IEC JTC 1/SC 29/WG 11; Jan. 17, 2020 (Year: 2020).*

(Continued)

*Primary Examiner* — Jeremiah C Hallenbeck-Huber

(57) ABSTRACT

Methods, systems, and bitstream syntax are described for constrained processing in video coding. Using one or more syntax elements and either explicit or implicit signaling, an encoder may signal to compliant decoders that certain features of the main profile, such as subpictures and multi-layered scalable coding, are disabled.

10 Claims, 3 Drawing Sheets

Related U.S. Application Data filed on Apr. 22, 2020, provisional application No. 63/013,474, filed on Apr. 21, 2020.

(56) References Cited

U.S. PATENT DOCUMENTS

| | | | |
|---|---|---|---|
| 2013/0113882 A1 | 5/2013 | Haque | |
| 2013/0182755 A1 | 7/2013 | Chen | |
| 2014/0016707 A1 | 1/2014 | Wang | |
| 2018/0278967 A1* | 9/2018 | Kerofsky | H04N 19/98 |
| 2020/0260070 A1* | 8/2020 | Yoo | H04N 19/61 |
| 2020/0267415 A1* | 8/2020 | Han | H04N 19/86 |
| 2021/0195254 A1* | 6/2021 | Oh | H04N 21/2362 |
| 2022/0141495 A1 | 5/2022 | Kim | |
| 2022/0295116 A1* | 9/2022 | Ma | H04N 19/117 |
| 2022/0400270 A1* | 12/2022 | Meardi | H04N 19/136 |
| 2023/0145618 A1* | 5/2023 | Laroche | H04N 19/119 375/240.26 |

OTHER PUBLICATIONS

B. Bross, J. Chen, S. Liu, and Y-K. Wang "Versatile Video Coding (Draft 9)," JVET output document, JVET-R2001, vA (10), JVET 18-th meeting, by teleconference, Apr. 15-24, 2020.

High efficiency video coding, H.265, Series H, Coding of moving video, ITU, (Feb. 2018).

Janneck, et al "Reconfigurable Video Coding: A stream Programming Approach to the Specification of New Video Coding Standards" Proc. of the first Annual ACM SIGMM Conference on Multimedia systems, Feb. 2010.

W. Wan et al., "VVC Version 1 Profiles," JVET-R0392 (v.6), JVET 18-th Meeting, Apr. 15-24, 2020.

Bross et al., Versatile Video Coding (Draft 8), Joint Video Experts Team (JVET) of ITU-T SG 16 WP 3 and ISO/IEC JTC 1/SC 29/WG 11, [JVET-Q2001-vE] (version 15), Mar. 12, 2020, pp. 1-4.

\* cited by examiner

SEMANTICS FOR CONSTRAINED PROCESSING AND CONFORMANCE TESTING IN VIDEO CODING

CROSS-REFERENCE TO RELATED APPLICATIONS

This application claims the benefit of priority to U.S. Provisional Patent Application No. 63/028,214, filed May 21, 2020, U.S. Provisional Patent Application No. 63/013, 713, filed Apr. 22, 2020, and U.S. Provisional Patent Application No. 63/013,474, filed Apr. 21, 2020, all of which are incorporated herein by reference in their entirety.

TECHNOLOGY

The present document relates generally to images. More particularly, an embodiment of the present invention relates to syntax elements and semantics for constrained processing and conformance testing in video coding.

BACKGROUND

In 2013, the MPEG group in the International Standardization Organization (ISO), jointly with the International Telecommunications Union (ITU), released the first draft of the HEVC (also known as H.265) video coding standard (Ref [1]). More recently, the same group has been working on the development of the next generation coding standard (referred to as Versatile Video Coding or VVC standard (Ref. [2])) that provides improved coding performance over existing video coding technologies.

To facilitate their deployment, video coding standards, such as HEVC and the like, may define profiles, tiers, and levels, and other syntax elements which specify restrictions on the bitstreams, and hence describe limits on the capabilities needed to decode the bitstreams. Profiles, tiers and levels, and other syntax elements may also be used to indicate interoperability points between individual decoder implementations.

As appreciated by the inventors here, improved techniques for defining restrictions on a VVC-compliant bitstream, and for improving conformance testing, while providing access to all of its versatile features, are described herein.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Figure 1:
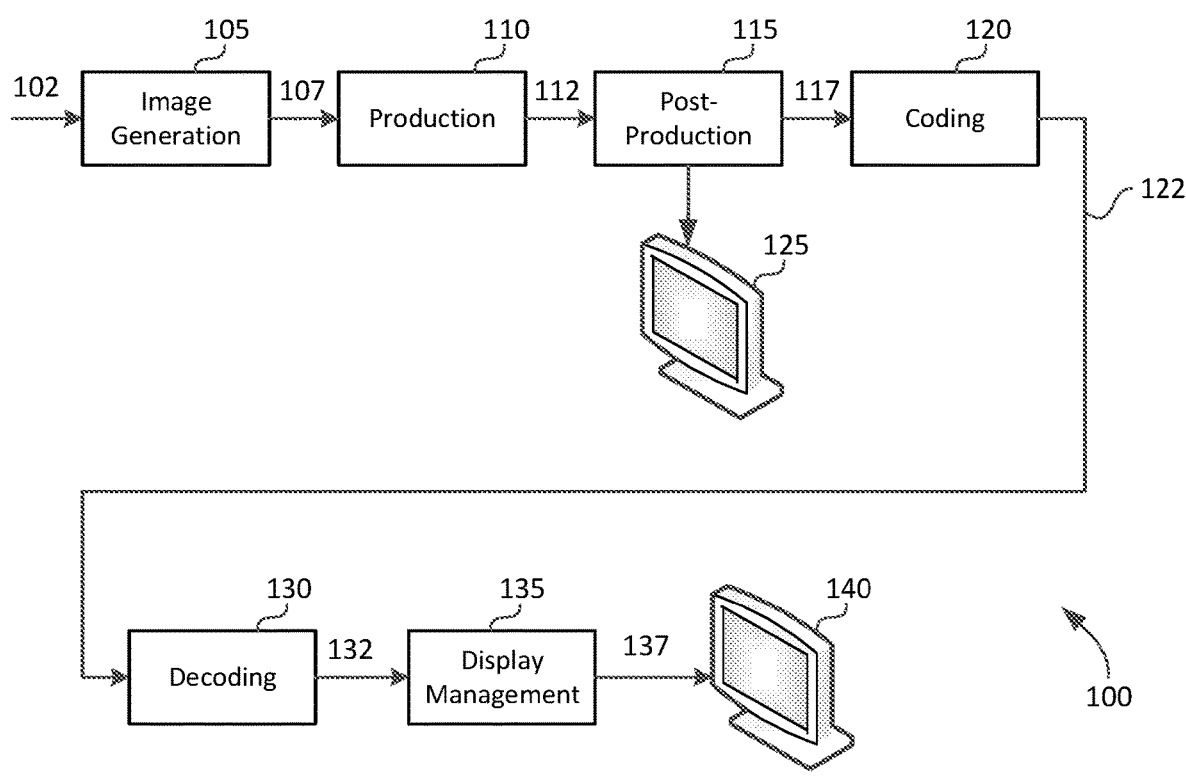
FIG. 1 depicts an example process for a video delivery pipeline.

Example embodiments that relate to semantics for constrained processing and conformance testing in the VVC coding specification are described herein. In the following description, for the purposes of explanation, numerous specific details are set forth in order to provide a thorough understanding of the various embodiments of present invention. It will be apparent, however, that the various embodiments of the present invention may be practiced without these specific details. In other instances, well-known structures and devices are not described in exhaustive detail, in order to avoid unnecessarily occluding, obscuring, or obfuscating embodiments of the present invention.

SUMMARY

Example embodiments described herein relate to semantics for constrained processing and conformance testing in video coding. In an encoder, a processor receives a sequence of video pictures to be encoded with constrained processing into a coded bitstream. The processor:
  determines a set of tools not necessary for decoding the coded bitstream by a decoder;
  determines one or more constraint flags related to the set of tools;
  groups the one or more constraint flags into one or more tool-constraint information syntax structures;
  combines the one or more tool-constraint information syntax structures into a general constraint syntax structure; and generates the coded bitstream, wherein the coded bitstream comprises coded pictures of the sequence of video pictures and the general constraint syntax structure.

In another embodiment, in a decoder, a processor receives a coded bitstream comprising coded pictures of a sequence of video pictures and a general constraint syntax structure, wherein the general constraint syntax structure comprises syntax elements for a set of tools not necessary for decoding the coded bitstream by the decoder. Then, the processor:
  parses the general constraint syntax structure to identify one or more tool-constraint information syntax structures, wherein each tool-constraint information syntax structure comprises one or more constraint flags related to a specific coding tool;
  parses each of the one or more tool-constraint information syntax structures to generate one or more constraint flags related to the set of tools; and
  decodes the coded pictures in the coded bitstream according to the one or more constraint flags to generate the sequence of video pictures.

In another embodiment, a processor receives a coded bitstream comprising coded pictures and syntax parameters for coded pictures, and detects whether layered processing is enabled, wherein detecting whether layered processing is enabled comprises detecting if one or more the following flags is set to 1:
  a flag indicating whether scalability or layered coding is enabled or not;
  a flag indicating whether a video parameter set (VPS) is constrained or not;

a flag indicating whether a total number of output layer sets (OLS) is constrained or not;

a flag indicating whether the layer to which a NAL unit belongs is constrained or not;

a flag indicating whether inter-layer prediction is constrained or not; and if one or more of these flags is set to 1, then it determines that layered processing is disabled, else it determines that layered processing is enabled.

In another embodiment, a processor receives a coded bitstream comprising coded pictures and syntax parameters for the coded pictures, and detects if one or more of the following flags is set to 1:

a flag indicating whether a video parameter set (VPS) is constrained or not;

a flag indicating whether a total number of output layer sets (OLS) is constrained or not;

a flag indicating whether the layer to which a NAL unit belongs is constrained or not;

a flag indicating whether a NAL unit type is constrained or not;

a flag indicating whether the number of slices in a picture is constrained or not;

a flag indicating whether the number of tiles in a picture is constrained or not;

a flag indicating whether the number of subpictures in a picture is constrained or not;

a flag indicating whether the dual tree partitions are constrained or not;

a flag indicating whether palette mode is constrained or not;

a flag indicating whether intra block copy is constrained or not;

a flag indicating whether intra prediction is constrained or not;

a flag indicating whether inter prediction is constrained or not;

a flag indicating whether quantization is constrained or not;

a flag indicating whether transforms are is constrained or not;

a flag indicating whether residual coding is constrained or not;

a flag indicating whether a loop filter is constrained or not;

a flag indicating whether sample bit depth is constrained or not;

a flag indicating whether chroma sampling format is constrained or not;

a flag indicating whether 360-video coding is constrained or not;

a flag indicating whether screen content coding is constrained or not;

a flag indicating whether the presence of SEI messages is constrained or not;

a flag indicating whether inter-layer prediction is constrained or not; and if one or more of these flags is set to 1, then it determines bitstream compliance.

Example Video Delivery Processing Pipeline

FIG. 1 depicts an example process of a conventional video delivery pipeline (100) showing various stages from video capture to video content display. A sequence of video frames (102) is captured or generated using image generation block (105). Video frames (102) may be digitally captured (e.g. by a digital camera) or generated by a computer (e.g. using computer animation) to provide video data (107). Alternatively, video frames (102) may be captured on film by a film camera. The film is converted to a digital format to provide video data (107). In a production phase (110), video data (107) is edited to provide a video production stream (112).

The video data of production stream (112) is then provided to a processor at block (115) for post-production editing. Block (115) post-production editing may include adjusting or modifying colors or brightness in particular areas of an image to enhance the image quality or achieve a particular appearance for the image in accordance with the video creator's creative intent. This is sometimes called "color timing" or "color grading." Other editing (e.g. scene selection and sequencing, image cropping, addition of computer-generated visual special effects, judder or blur control, frame rate control, etc.) may be performed at block (115) to yield a final version (117) of the production for distribution. During post-production editing (115), video images are viewed on a reference display (125).

Following post-production (115), video data of final production (117) may be delivered to encoding block (120) for delivering downstream to decoding and playback devices such as television sets, set-top boxes, movie theaters, and the like. In some embodiments, coding block (120) may include audio and video encoders, such as those defined by ATSC, DVB, DVD, Blu-Ray, and other delivery formats, to generate coded bit stream (122). In a receiver, the coded bit stream (122) is decoded by decoding unit (130) to generate a decoded signal (132) representing an identical or close approximation of signal (117). The receiver may be attached to a target display (140) which may have completely different characteristics than the reference display (125). In that case, a display management block (135) may be used to map the dynamic range of decoded signal (132) to the characteristics of the target display (140) by generating display-mapped signal (137).

Constrained Processing in VVC

The current working draft text for the VVC specification (Ref [2]) specifies a set of constraint flags as a means of allowing encoders to notify decoders that certain coding tools are not needed in decoding the coded bitstream, and as an alternative way to facilitate sub-profiles outside of the existing, official, profiles, e.g., the Main 10 profile and the Main 4:4:4 10 profile. For example, each of these profiles limits conforming bitstreams to particular chroma formats and bit depths, and requires that particular tier and level constraints are fulfilled, but allows all coding tools specified in VVC to be indicated in a conforming bitstream.

Some applications and uses of VVC may not require all coding tools and features specified in VVC. Such applications would benefit if the corresponding decoding process implements a subset of coding tools, yet a compliant decoder remains capable of decoding conforming bit streams. One way in which such a decoding process could be accommodated would be to define additional profiles for VVC. For example, a "Simplified Main 10" profile could be specified to be identical to the Main 10 profile, except that one or more particular coding tools, and associated syntax, would not be allowed to be signalled in the bitstream. Or if they are identified in the bitstream, a compliant decoder could safely ignore them. For example, a Simple Main 10 profile might not allow scalability or subpictures.

One disadvantage of defining multiple profiles is that it may limit the accessible market for device and application providers through facilitation of market fragmentation. Another disadvantage of multiple profiles is that it makes conformance testing and verification more difficult, which may impact quality and interoperability between bitstream creators and consumers.

An alternative to profile fragmentation, as proposed here by example embodiments, is to package syntactic constraints into a small number of general constraint information syntax elements that are applied to the Main 10 and Main 4:4:4 10 profiles, and any equivalent still image profiles of VVC. For example, the general constraint information syntax element no subpicture constraint flag may be signalled in a bitstream to indicate that parsing and decoding processes are not required to decode subpictures in the bitstream, yet the bitstream still conforms to a profile, for example, the Main 10 profile. One advantage of the general constraint method proposed here is that it facilitates conformance testing and verification.

Utilization of general constraint information syntax elements may also facilitate specification of domain-specific sub-profiles by application Standards Developing Organizations (SDOs) and other organizations such as industry fora. In this sense, utilization of general constraint information syntax elements facilitates specification of a kind of 'soft profile' that is easier to specify and verify.

The current VVC draft specification includes 62 general constraint flags that specify limitations on the behaviour of coding tools and values of syntax elements. The existing general constraint flags relate to network abstraction layer (NAL) unit types, prediction modes, inter and intra prediction, transforms, quantization, loop filters, layers, supplemental enhancement information (SEI) messages, and formats. All 62 general constraint flags are currently signalled in the general_contstraint_info( ) syntax structure.

As currently specified, the list of general constraint flags may be confusing as there is no logical order to the list. The lack of order may discourage use of general constraint flags and thus limit their benefit. In addition, the general_constraint_info( ) syntax structure, as currently specified, would tend to make the list of general constraint flags even more confusing in the future if additional general constraint flags are added. To preserve backwards compatibility, new flags would be added to end of the list without regard to the function of the new flags.

As appreciated by the inventors, the general_constraint_info( ) structure can be made easier to use and less prone to user error by signalling separate, categorized, syntax structures, with limited scope but more flexibility For example, a general_transform_constraint_info( ) syntax structure, related to tools relevant to transform coding, may be signalled as part of the general_constraint_info( ) call. The example general_transform_constraint_info( ) syntax structure can signal only the general constraint flags relevant for transforms. Similarly, and by example, calls like general_quantization_constraint_info( ), general_inter_constraint_infor( ), and general_loop_filter_info( ), and the like, can be signalled in general_constraint_info( ) to group general constraint flags related to quantization, inter prediction, and loop filters, respectively.

An additional benefit of categorized, limited-scope, general constraint syntax structures is that such structures facilitate adding new general constraint flags efficiently in a backwards compatible manner. New flags added to the end of a shorter list of related flags preserves ease of use and reduces the tendency for user error.

In another embodiment, some new general constraint flags are also added. The new flags may be grouped into three general classes: 1) coding-tool flags; 2) functionality-limitation flags; and 3) supplemental enhancement information (SEI) flags.

Coding-tool general constraint flags are consistent with currently specified general constraint flags in that they specify limitations on coding tools and syntax element values. As an example, proposed new coding tool general constraint flags include: no_virtual_boundary_constraint_flag; no_weighted_prediction_constraint_flag; no_weighted_bipred_constraint_flag; no_explicit_scaling_list_constraint_flag; and no_vps_constraint_flag.

Functionality-limitation general constraint flags provide new capability for specifying limitations on groups of coding tools, other constraint flags, and values of syntax elements. Functionality-limitation flags also facilitate conformance testing related to use cases, services, and application types. As an example, functionality-limitation general constraint flags proposed here include: no_scalability_constraint_flag, which specifies that scalable and layered coding are disabled; no_360Video_constraint_flag, which specifies that 360-video coding is disabled; and noSCC_constraint_flag, which specifies that screen content coding is disabled.

SEI general constraint flags extend the capability to specify which SEI messages, which are typically specified outside of the core VVC specification, are not present. Incorporating SEI messages enables information to be signalled to decoders or other processing that indicate how coded video may be used or intended to be used, displayed, or otherwise manipulated. As an example, proposed new SEI general constraint flags proposed include: no_scalable_nesting_SEI_constraint_flag; no_subpic_level_SEI_constraint_flag; no_filler_payload_SEI_constraint_flag; no_user_data_reg_SEI_constraint_flag; no_user_data_unreg_SEI_constraint_flag; no_film_grain_SEI_constraint_flag; no_parameter_set_incl_SEI_constraint_flag; no_decoded_picture_hash_SEI_constraint_flag; no_mdcv_SEI_constraint_flag; no_cll_SEI_constraint_flag; no_DRAP_constraint_SEI_flag; no_alt_transfer_char_SEI_constraint_flag; no_ambient_view_envir_SEI_constraint_flag; no_ccv_SEI_constraint_flag; no_omni_video_specific_SEI_constraint_flag; no_field_frame_info_SEI_constraint_flag; and no_sar_SEI_constraint_flag.

In another embodiment, to improve the clarity of currently specified general constraint flags, slightly modified names are proposed as follows:
  Change the general_non_packed_constraint_flag to general_non_packed_SEI_constraint_flag
  Change the general_non_projected_constraint_flag to general_non_projected_SEI_constraint_flag
  Change the max_bitdepth_constraint_idc variable to max_bitdepth_minus8_constraint_idc
  Correct the semantics for the no_aps_constraint_flag to refer to the sps_explicit_scaling_list_enabled_flag
  Split the single_layer_constraint_flag into two general constraint flags: a) the no_vps_constraint flag, which when equal to 1 specifies that sps_video_parameter_set_id shall be equal to 0; and b) the single_layer_constraint_flag, which when equal to 1 specifies that vps_max_layers_minus1 shall be equal to 0.

Note that the syntax, semantics, methods, and benefits of embodiments presented herein apply to alternative means of signalling general constraint information flags, such as, for example: signalling general_constraint_info( ) in a NAL unit with type, GCI_NUT; and signalling general_constraint_info( ) in decoding_capability_information_rbsp( ).

In an embodiment, Table 1 depicts an example syntax for the proposed new structure of the "General constraint information syntax" in VVC, replacing Sec. 7.3.3.2 in Ref. [2]. As depicted in Table 1, all existing flags are replaced with twelve general_xxx_constraint_info( ) structures, wherein "xxx" describes an aspect of VVC coding, such as partitioning, intra coding, loop-filtering, and the like. Each of these twelve syntax structures are also described in further detail in Tables 2-13. Proposed new flags are depicted in an italic font and may also be explicitly noted after each Table. A person skilled in video coding would appreciate that one may group the existing and the newly proposed constraint flags and syntax parameters using fewer or more than twelve general_xxx_constraint_info( ) structures. Furthermore, while every effort was made to group these flags into the most appropriate "xxx" group, one or more of these flags could be assigned to alternative groups with minimal, if any, effect to overall functionality.

Note that the order of general_xxx_constraint_info( ) syntax structures in Table 1 may affect the check of syntax validation and overall decoding performance. As an example, general_format_constraint_info( ) includes max_chroma_format_constraint_idc which is referenced by the semantics of no_qtbtt_dual_tree_intra_constraint_flag (signalled in general_partition_constraint_info( )) and by the semantics of the no_cclm_constraint_flag (signalled in general_intra_constraint_info( )). Thus, signalling general_format_constraint_info( ) before signalling general_partition_constraint_info( ) and general_intra_constraint_info( ) simplifies syntax checking. As another example, general_functionality_constraint_info( ) includes the general_one_picture_only_constraint_flag which is referenced by the semantics of single_layer_constraint_flag (signalled in general_layer_constraint_info( )). Thus, signalling general_functionality_constraint_info( ) before signalling general_layer_contraint_info( ) simplifies again syntax checking. In another embodiment, instead of ordering the general_xxx_constraint_info( ) structures according to ease of syntax checking, their order can be decided based on other criteria, such as the importance of coding tools, the decoder flow, and the like.

The proposed groups of categories can also be re-organized, sub-divided or combined. For example, in an embodiment, as depicted later in Table 18, one can combine the quantization group and the transform group into a larger group, named, say, "tqr," for transform, quantization, and residue coding. In another embodiment, one can combine the pred_mod, intra, and inter groups into a larger "prediction_tools" group. In another embodiment, one can split the quantization group into a smaller quantization group and a residue coding group.

The tools in each category can also be organized depending on, for example, the emphasis of the importance of the tool. For example, IBC and palette mode mainly have gain for intra picture coding, thus they may be included into the intra constraints group. As another example, as depicted in the general_tqr_constraint_info( ) structure, it can be beneficial to signal transform-related constraint flags before quantization-related constraint flags because, for instance, the no_transform_skip_constraint_flag is referenced by the no_bdpcm_constraint_flag.

TABLE 1

Example of proposed "General constraint information syntax"

| | Descriptor |
|---|---|
| general_constraint_info( ) { | |
|   general_format_constraint_info( ) | |
|   general_functionality_constraint_info( ) | |
|   general_NALU_constraint_info( ) | |
|   general_partiton_constraint_info( ) | |
|   general_pred_mode_constraint_info( ) | |
|   general_intra_constraint_info( ) | |
|   general_inter_constraint_info( ) | |
|   general_transform_constraint_info( ) | |
|   general_quantization_constraint_info( ) | |
|   general_loop_filter_constraint_info( ) | |
|   general_layer_constraint_info( ) | |
|   general_SEI_constraint_info( ) | |
| } | |

TABLE 2

Example of general format constraint information syntax

| | Descriptor |
|---|---|
| general_format_constraint_info( ) { | |
|   general_frame_only_constraint_flag | u(1) |
|   max_bitdepth_minus8_constraint_idc | u(3) |
|   max_chroma_format_constraint_idc | u(2) |
|   *no_separate_colour_plane_constraint_flag* | *u(1)* |
|   while( !byte_aligned( ) ) | |
|     gci_format_alignment_zero_bit | f(1) |
|   gci_format_num_reserved_bytes | u(8) |
|   for( i = 0; i < gci_format_num_reserved_bytes; i++ ) | |
|     gci_format_reserved_byte[ i ] | u(8) |
| } | |

The semantics for the proposed new flag are:

no_separate_colour_plane_constraint_flag equal to 1 specifies that sps_separate_colour_plane_flag, when present, shall be equal to 0. no_separate_colour_plane_constraint_flag equal to 0 does not impose such a constraint.

TABLE 3

Example of general functionality information syntax

| | Descriptor |
|---|---|
| general_functionality_constraint_info( ) { | |
|   general_one_picture_only_constraint_flag | u(1) |
|   *no_scalability_constraint_flag* | *u(1)* |
|   *no_360_video_constraint_flag* | *u(1)* |
|   *no_scc_constraint_flag* | *u(1)* |
|   while( !byte_aligned( ) ) | |
|     gci_functionality_alignment_zero_bit | f(1) |

TABLE 3-continued

Example of general functionality information syntax

| | Descriptor |
|---|---|
| gci_functionality_num_reserved_bytes<br>  for( i = 0; i < gci_functionality_num_reserved_bytes; i++ )<br>    gci_functionality_reserved_byte[ i ]<br>} | u(8)<br><br>u(8) |

The semantics for the proposed new flags are:

no_scalability_constraint_flag equal to 1 specifies that scalable and layered coding are disabled for the CVS. no_scalability_constraint_flag equal to 0 does not impose such a constraint.

The value of no_scalability_constraint_flag shall be equal to the value of the variable noScalabilityConstraint. The value of noScalabilityConstraint is derived as follows:

```
if( ( sps_video_parameter_set_id == 0 ) ||
    ( vps_max_layers_minus1 == 0 ) ||
    vps_all_independent_layers_flag )
    noScalabilityConstraint = 1
else
    noScalabilityConstraint = 0
``` no_360_video_constraint_flag equal to 1 specifies that sps_ref_wraparound_enabled_flag shall be equal to 0 and there shall not be any equirectangular projection SEI messages or generalized cubemap projection SEI messages present in the bitstream of the OlsInScope. no_360_video_constraint_flag equal to 0 does not impose such a constraint.

no_scc_constraint_flag equal to 1 specifies that sps_ibc_enabled_flag shall be equal to 0, sps_bdpcm_enabled_flag shall be equal to 0, and sps_palette_enabled_flag shall be equal to 0. no_scc_constraint_flag equal to 0 does not impose such a constraint.

In another embodiment, since transform skip mainly has gain for screen content coding, the semantics of the no_scc_constraint_flag can be written as following:

no_scc_constraint_flag equal to 1 specifies that sps_ibc_enabled_flag shall be equal to 0, sps_transform_skip_enabled_flag shall be equal to 0, sps_bdpcm_enabled_flag shall be equal to 0, and sps_palette_enabled_flag shall be equal to 0. no_scc_constraint_flag equal to 0 does not impose such a constraint.

TABLE 4

Example of proposed NALU constraint information syntax

| | Descriptor |
|---|---|
| general_NALU_constraint_info( ) { | |
|   no_mixed_nalu_types_in_pic_constraint_flag | u(1) |
|   no_trail_constraint_flag | u(1) |
|   no_stsa_constraint_flag | u(1) |
|   no_rasl_constraint_flag | u(1) |
|   no_radl_constraint_flag | u(1) |
|   no_idr_constraint_flag | u(1) |
|   no_cra_constraint_flag | u(1) |
|   no_gdr_constraint_flag | u(1) |
|   no_aps_constraint_flag | u(1) |
|   while( !byte_aligned( ) ) | |
|     gci_nalu_alignment_zero_bit | f(1) |

TABLE 4-continued

Example of proposed NALU constraint information syntax

| | Descriptor |
|---|---|
|   gci_nalu_num_reserved_bytes | u(8) |
|   for( i = 0; i < gci_nalu_num_reserved_bytes; i++ ) | |
|     gci_nalu_reserved_byte[i ] | u(8) |
| } | |

TABLE 5

Example of proposed partition constraint information syntax

| | Descriptor |
|---|---|
| general_partition_constraint_info( ) { | |
|   one_tile_per_pic_constraint_flag | u(1) |
|   pic_header_in_slice_header_constraint_flag | u(1) |
|   one_slice_per_pic_constraint_flag | u(1) |
|   one_subpic_per_pic_constraint_flag | u(1) |
|   no_qtbtt_dual_tree_intra_constraint_flag | u(1) |
|   no_partition_constraints_override_constraint_flag | u(1) |
|   *no_virtual_boundary_constraint_flag* | *u(1)* |
|   while( !byte_aligned( ) ) | |
|     gci_partition_alignment_zero_bit | f(1) |
|   gci_partition_num_reserved_bytes | u(8) |
|   for( i = 0; i < gci_partition_num_reserved_bytes; i++ ) | |
|     gci_partition_reserved_byte[i ] | u(8) |
| } | |

The semantics for the proposed new flag are:

no_virtual_boundary_constraint_flag equal to 1 specifies that sps_virtual_boundaries_enabled_flag shall be equal to 0. no_virtual_boundary_constraint_flag equal to 0 does not impose such a constraint.

TABLE 6

Example of proposed syntax for prediction mode constraint information

| | Descriptor |
|---|---|
| general_pred_mode_constraint_info( ) { | |
|   intra_only_constraint_flag | u(1) |
|   no_palette_constraint_flag | u(1) |
|   no_ibc_constraint_flag | u(1) |
|   while( !byte_aligned( ) ) | |
|     gci_pred_mode_alignment_zero_bit | f(1) |
|   gci_pred_mode_num_reserved_bytes | u(8) |
|   for( i = 0; i < gci_pred_mode_num_reserved_bytes; i++ | |
|   ) | |
|     gci_pred_mode_reserved_byte[i ] | u(8) |
| } | |

TABLE 7

Example of general intra prediction constraint information syntax

| | Descriptor |
|---|---|
| general_intra_constraint_info( ) { | |
|   no_mrl_constraint_flag | u(1) |
|   no_isp_constraint_flag | u(1) |
|   no_mip_constraint_flag | u(1) |
|   no_cclm_constraint_flag | u(1) |
|   while( !byte_aligned( ) ) | |
|     gci_intra_alignment_zero_bit | f(1) |
|   gci_intra_num_reserved_bytes | u(8) |
|   for( i = 0; i < gci_intra_num_reserved_bytes; i++ ) | |
|     gci_intra_reserved_byte[i] | u(8) |
| } | |

TABLE 8

Example of general inter prediction constraint information syntax

| | Descriptor |
|---|---|
| general_inter_constraint_info( ) { | |
|   no_ref_pic_resampling_constraint_flag | u(1) |
|   no_res_change_in_clvs_constraint_flag | u(1) |
|   no_ref_wraparound_constraint_flag | u(1) |
|   no_temporal_mvp_constraint_flag | u(1) |
|   no_sbtmvp_constraint_flag | u(1) |
|   no_amvr_constraint_flag | u(1) |
|   no_bdof_constraint_flag | u(1) |
|   no_dmvr_constraint_flag | u(1) |
|   no_affine_motion_constraint_flag | u(1) |
|   no_mmvd_constraint_flag | u(1) |
|   no_smvd_constraint_flag | u(1) |
|   no_prof_constraint_flag | u(1) |
|   no_bcw_constraint_flag | u(1) |
|   no_ciip_constraint_flag | u(1) |
|   no_gpm_constraint_flag | u(1) |
|   *no_weighted_pred_constraint_flag* | *u(1)* |
|   *no_weighted_bipred_constraint_flag* | *u(1)* |
|   while( !byte_aligned( ) ) | |
|     gci_inter_alignment_zero_bit | f(1) |
|   gci_inter_num_reserved_bytes | u(8) |
|   for( i = 0; i < gci_inter_num_reserved_bytes; i++ ) | |
|     gci_inter_reserved_byte[i] | u(8) |
| } | |

The semantics for the proposed new flags are:

no_weighted_pred_constraint_flag equal to 1 specifies that sps_weighted_pred_flag shall be equal to 0. no_weighted_pred_constraint_flag equal to 0 does not impose such a constraint.

no_weighted_bipred_constraint_flag equal to 1 specifies that sps_weighted_bipred_flag shall be equal to 0. no_weighted_bipred_constraint_flag equal to 0 does not impose such a constraint.

TABLE 9

Example of general transform constraint information syntax

| | Descriptor |
|---|---|
| general_transform_constraint_info( ) { | |
|   no_mts_constraint_flag | u(1) |
|   no_sbt_constraint_flag | u(1) |
|   no_lfnst_constraint_flag | u(1) |
|   no_transform_skip_constraint_flag | u(1) |
|   no_act_constraint_flag | u(1) |
|   while( !byte_aligned( ) ) | |
|     gci_transform_alignment_zero_bit | f(1) |

TABLE 9-continued

Example of general transform constraint information syntax

| | Descriptor |
|---|---|
|   gci_transform_num_reserved_bytes | u(8) |
|   for( i = 0; i < gci_transform_num_reserved_bytes; i++ ) | |
|     gci_transform_reserved_byte[i] | u(8) |
| } | |

TABLE 10

Example of general quantization constraint information syntax

| | Descriptor |
|---|---|
| general_quant_constraint_info( ) { | |
|   no_joint_cbcr_constraint_flag | u(1) |
|   no_bdpcm_constraint_flag | u(1) |
|   no_tsrc_constraint_flag | u(1) |
|   no_cu_qp_delta_constraint_flag | u(1) |
|   no_chroma_qp_offset_constraint_flag | u(1) |
|   no_dep_quant_constraint_flag | u(1) |
|   no_sign_data_hiding_constraint_flag | u(1) |
|   *no_explicit_scaling_list_constraint_flag* | *u(1)* |
|   while( !byte_aligned( ) ) | |
|     gci_quant_alignment_zero_bit | f(1) |
|   gci_quant_num_reserved_bytes | u(8) |
|   for( i = 0; i < gci_quant_num_reserved_bytes; i++ ) | |
|     gci_quant_reserved_byte[i] | u(8) |
| } | |

The semantics for the proposed new flag are:

no_explicit_scaling_list_constraint_flag equal to 1 specifies that sps_explicit_scaling_list_enabled_flag shall be equal to 0.

no_explicit_scaling_list_constraint_flag equal to 0 does not impose such a constraint. When no_aps_constraint_flag is equal to 1, the value of no_explicit_scaling_list_constraint_flag shall be equal to 1.

TABLE 11

Example of general loop filter constraint information syntax

| | Descriptor |
|---|---|
| general_loop_filter_constraint_info( ) { | |
|   no_sao_constraint_flag | u(1) |
|   no_alf_constraint_flag | u(1) |
|   no_ccalf_constraint_flag | u(1) |
|   no_ladf_constraint_flag | u(1) |
|   no_lmcs_constraint_flag | u(1) |
|   while( !byte_aligned( ) ) | |
|     gci_loop_filter_alignment_zero_bit | f(1) |
|   gci_loop_filter_num_reserved_bytes | u(8) |
|   for( i = 0; i < gci_loop_filter_num_reserved_bytes; i++ ) | |
|     gci_loop_filter_reserved_byte[i] | u(8) |
| } | |

TABLE 12

Example of general layer constraint information syntax

| | Descriptor |
|---|---|
| general_layer_constraint_info( ) { | |
|   *no_vps_constraint_flag* | *u(1)* |
|   single_layer_constraint_flag | u(1) |
|   all_layers_independent_constraint_flag | u(1) |
|   *no_ilrp_constraint_flag* | *u(1)* |

TABLE 12-continued

Example of general layer constraint information syntax

| | Descriptor |
|---|---|
| no_mnli_constraint_flag | *u(1)* |
| no_mols_constraint_flag | *u(1)* |
| while( !byte_aligned( ) ) | |
|     gci_layer_alignment_zero_bit | f(1) |
| gci_layer_num_reserved_bytes | u(8) |
| for( i = 0; i < gci_layer_num_reserved_bytes; i++ ) | |
|     gci_layer_reserved_byte[i] | u(8) |
| } | |

The semantics for the proposed new flags are:

no_vps_constraint_flag equal to 1 specifies that sps_video_parameter_set_id shall be equal to 0. no_vps_constraint_flag equal to 0 does not impose such a constraint. When general_one_picture_only_constraint_flag is equal to 1, the value of no_vps_constraint_flag shall be equal to 1.

no_ilrp_constraint_flag equal to 1 specifies that the value of sps_inter_layer_ref_pics_present_flag shall be equal to 0. no_ilrp_constraint_flag equal to 0 does not impose such a constraint.

no_mnli_constraint_flag equal to 1 specifies that all VCL NAL units in the CVS shall have the same value of nuh_layer_id. no_mnli_constraint equal to 0 does not impose such a constraint.

When the value of no_mnli_constraint is equal to 1, then one or more of the following applies:

The value of vps_max_layers_minus1 shall be equal to 0

The value of each_layer_is_an_ols_flag is inferred to be equal to 1 no_mols_constraint_flag equal to 1 specifies that the total number of output layer sets (OLSs) specified by the VPS is equal to 1. no_mols_constraint_flag equal to 0 does not impose such a constraint.

When the value of no_mols_constraint_flag is equal to 1, one or more of the following applies:

The value of no_vps_constraint_flag shall be equal to 0

The value of sps_video_parameter_set shall not be equal to 0

When the value of vps_max_layers_minus1 is greater than 0, the value of each_layer_is_an_ols_flag shall be equal to 0 and the value of vps_all_independent_layers_flag shall be 0

When the value of ols_mode_idc is equal to 2, the value of num_output_layer_sets_minus1 shall be equal to 0. Otherwise, the value of ols_mode_idc is equal to 0 or 1, the value of vps_max_layers_minus1 shall be equal to 0.

TABLE 13

Example of general supplemental enhancement information message constraint information syntax

| | Descriptor |
|---|---|
| general_sei_constraint_info( ) { | |
|   no_scalable_nesting_SEI_constraint_flag | *u(1)* |
|   no_subpic_level_SEI_constraint_flag | *u(1)* |
|   no_filter_payload_SEI_constraint_flag | *u(1)* |
|   no_user_data_reg_SEI_constraint_flag | *u(1)* |
|   no_user_data_unreg_SEI_constraint_flag | *u(1)* |
|   no_film_grain_SEI_constraint_flag | *u(1)* |
|   general_non_packed_SEI_constraint_flag | u(1) |
|   general_non_projected_SEI_constraint_flag | u(1) |
|   no_parameter_set_incl_SEI_constraint_flag | *u(1)* |

TABLE 13-continued

Example of general supplemental enhancement information message constraint information syntax

| | Descriptor |
|---|---|
|   no_decoded_picture_hash_SEI_constraint_flag | *u(1)* |
|   no_mdcv_SEI_constraint_flag | *u(1)* |
|   no_cll_SEI_constraint_flag | *u(1)* |
|   no_DRAP_constraint_SEI_flag | *u(1)* |
|   no_alt_transfer_char_SEI_constraint_flag | *u(1)* |
|   no_ambient_view_envir_SEI_constraint_flag | *u(1)* |
|   no_ccv_SEI_constraint_flag | *u(1)* |
|   no_omni_video_specific_SEI_constraint_flag | *u(1)* |
|   no_field_frame_info_SEI_constraint_flag | *u(1)* |
|   no_sar_SEI_constraint_flag | *u(1)* |
|   while( !byte_aligned( ) ) | |
|     gci_sei_alignment_zero_bit | f(1) |
|   gci_sei_num_reserved_bytes | u(8) |
|   for( i = 0; i < gci_sei_num_reserved_bytes; i++ ) | |
|     gci_sei_reserved_byte[i] | u(8) |
| } | |

The semantics for the proposed new flags are:

no_scalable_nesting_SEI_constraint_flag equal to 1 specifies that there shall not be any scalable nesting SEI messages present in the bitstream of the OlsInScope. no_scalable_nesting_SEI_constraint_flag equal to 0 does not impose such a constraint.

no_subpic_level_SEI_constraint_flag equal to 1 specifies that there shall not be any subpicture level SEI messages present in the bitstream of the OlsInScope. no_subpic_level_SEI_constraint_flag equal to 0 does not impose such a constraint.

no_filler_payload_SEI_constraint_flag equal to 1 specifies that there shall not be any filler payload SEI messages present in the bitstream of the OlsInScope. no_filler_payload_SEI_constraint_flag equal to 0 does not impose such a constraint.

no_user_data_reg_SEI_constraint_flag equal to 1 specifies that there shall not be any user data registered by Recommendation ITU T.35 SEI messages present in the bitstream of the OlsInScope. no_user_data_reg_SEI_constraint_flag equal to 0 does not impose such a constraint.

no_user_data_unreg_SEI_constraint_flag equal to 1 specifies that there shall not be any user data unregistered SEI messages present in the bitstream of the OlsInScope. no_user_data_unreg_SEI_constraint_flag equal to 0 does not impose such a constraint.

no_film_grain_SEI_constraint_flag equal to 1 specifies that there shall not be any film grain characteristics SEI messages present in the bitstream of the OlsInScope. no_film_grain_SEI_constraint_flag equal to 0 does not impose such a constraint.

no_parameter_set_incl_SEI_constraint_flag equal to 1 specifies that there shall not be any parameter sets inclusion indication SEI messages present in the bitstream of the OlsInScope. no_parameter_set_incl_SEI_constraint_flag equal to 0 does not impose such a constraint.

no_decoded_picture_hash_SEI_constraint_flag equal to 1 specifies that there shall not be any decoded picture hash SEI messages present in the bitstream of the OlsInScope. no_decoded_picture_hash_SEI_constraint_flag equal to 0 does not impose such a constraint.

no_mcdv_SEI_constraint_flag equal to 1 specifies that there shall not be any mastering display colour volume SEI messages present in the bitstream of the OlsInScope. No_mcdv_SEI_constraint_flag equal to 0 does not impose such a constraint.

no_cll_SEI_constraint_flag equal to 1 specifies that there shall not be any content light level SEI messages present in the bitstream of the OlsInScope. no_cll_SEI_constraint_flag equal to 0 does not impose such a constraint.

no_DRAP_SEI_constraint_flag equal to 1 specifies that there shall not be any dependent random access point indication SEI messages present in the bitstream of the OlsInScope. no_DRAP_SEI_constraint_flag equal to 0 does not impose such a constraint.

no_alt_transfer_char_SEI_constraint_flag equal to 1 specifies that there shall not be any alternative transfer characteristics SEI messages present in the bitstream of the OlsInScope. no_alt_transfer_char_SEI_constraint_flag equal to 0 does not impose such a constraint.

no_ambient_view_envir_SEI_constraint_flag equal to 1 specifies that there shall not be any ambient viewing environment SEI messages present in the bitstream of the OlsInScope. no_ambient_view_envir_SEI_constraint_flag equal to 0 does not impose such a constraint.

no_ccv_SEI_constraint_flag equal to 1 specifies that there shall not be any content colour volume SEI messages present in the bitstream of the OlsInScope. no_ccv_SEI_constraint_flag equal to 0 does not impose such a constraint.

no_omni_video_specific_SEI_constraint_flag equal to 1 specifies that there shall not be any omnidirectional video specific SEI messages present in the bitstream of the OlsInScope. no_omni_video_specific_SEI_constraint_flag equal to 0 does not impose such a constraint.

no_field_frame_SEI_constraint_flag equal to 1 specifies that there shall not be any frame-field information SEI messages present in the bitstream of the OlsInScope. no_field_frame_SEI_constraint_flag equal to 0 does not impose such a constraint.

no_sar_SEI_constraint_flag equal to 1 specifies that there shall not be any sample aspect ratio SEI messages present.

For completeness, the following sections describe again the semantics for the flags in Tables 2-13, including both the existing ones and the newly proposed ones.

General Format Constraint Information Semantics general_frame_only_constraint_flag equal to 1 specifies that OlsInScope conveys pictures that represent frames. general_frame_only_constraint_flag equal to 0 specifies that OlsInScope conveys pictures that may or may not represent frames. When general_frame_only_constraint_flag is equal to 1, the value of sps_field_seq_flag shall be equal to 0.

NOTE—Decoders may ignore the value of general_frame_only_constraint_flag, as there are no decoding process requirements associated with it.

max_bitdepth_minus8_constraint_idc specifies that sps_bit_depth_minus8 shall be in the range of 0 to max_bitdepth_minus8_constraint_idc, inclusive.

max_chroma_format_constraint_idc specifies that sps_chroma_format_idc shall be in the range of 0 to max_chroma_format_constraint_idc, inclusive.

General Functionality Information Semantics general_one_picture_only_constraint_flag equal to 1 specifies that there is only one coded picture in the bitstream. general_one_picture_only_constraint_flag equal to 0 does not impose such a constraint.

no_scalability_constraint_flag equal to 1 specifies that scalable and layered coding are disabled for the CVS. no_scalability_constraint_flag equal to 0 does not impose such a constraint.

The value of no_scalability_constraint_flag shall be equal to the value of the variable noScalabilityConstraint. The value of noScalabilityConstraint is derived as follows:

```
if( ( sps_video_parameter_set_id == 0 ) ||
  ( vps_max_layers_minus1 == 0 ) ||
  vps_all_independent_layers_flag )
    noScalabilityConstraint = 1
else
    noScalabilityConstraint = 0
``` no_360_video_constraint_flag equal to 1 specifies that sps_ref_wraparound_enabled_flag shall be equal to 0 and there shall not be any equirectangular projection SEI messages or generalized cubemap projection SEI messages present in the bitstream of the OlsInScope. no_360_video_constraint_flag equal to 0 does not impose such a constraint.

no_scc_constraint_flag equal to 1 specifies that sps_ibc_enabled_flag shall be equal to 0, sps_bdpcm_enabled_flag shall be equal to 0, and sps_palette_enabled_flag shall be equal to 0. no_scc_constraint_flag equal to 0 does not impose such a constraint.

General NAL Unit Constraint Information Semantics no_mixed_nalu_types_in_pic_constraint_flag equal to 1 specifies that it is a requirement of bitstream conformance that pps_mixed_nalu_types_in_pic_flag shall be equal to 0. no_mixed_nalu_types_in_pic_constraint_flag equal to 0 does not impose such a constraint.

no_trail_constraint_flag equal to 1 specifies that there shall be no NAL unit with nuh_unit_type equal to TRAIL_NUT present in OlsInScope. no_trail_constraint_flag equal to 0 does not impose such a constraint.

no_stsa_constraint_flag equal to 1 specifies that there shall be no NAL unit with nuh_unit_type equal to STSA_NUT present in OlsInScope. no_stsa_constraint_flag equal to 0 does not impose such a constraint.

no_rasl_constraint_flag equal to 1 specifies that there shall be no NAL unit with nuh_unit_type equal to RASL_NUT present in OlsInScope. no_rasl_constraint_flag equal to 0 does not impose such a constraint.

no_radl_constraint_flag equal to 1 specifies that there shall be no NAL unit with nuh_unit_type equal to RADL_NUT present in OlsInScope. no_radl_constraint_flag equal to 0 does not impose such a constraint.

no_idr_constraint_flag equal to 1 specifies that there shall be no NAL unit with nuh_unit_type equal to IDR_W_RADL or IDR_N_LP present in OlsInScope. no_idr_constraint_flag equal to 0 does not impose such a constraint.

no_cra_constraint_flag equal to 1 specifies that there shall be no NAL unit with nuh_unit_type equal to CRA_NUT present in OlsInScope. no_cra_constraint_flag equal to 0 does not impose such a constraint.

no_gdr_constraint_flag equal to 1 specifies that sps_gdr_enabled_flag shall be equal to 0. no_gdr_constraint_flag equal to 0 does not impose such a constraint.

no_aps_constraint_flag equal to 1 specifies that there shall be no NAL unit with nuh_unit_type equal to PREFIX_APS_NUT or SUFFIX_APS_NUT present in OlsInScope, and the sps_lmcs_enabled_flag and sps_explicit_scaling_list_enabled_flag shall both be equal to 0. no_aps_constraint_flag equal to 0 does not impose such a constraint.

General Partition Constraint Information Semantics one_tile_per_pic_constraint_flag equal to 1 specifies that each picture shall contain only one tile. one_tile_per_pic_constraint_flag equal to 0 does not impose such a constraint pic_header_in_slice_header_constraint_flag equal to 1 specifies that each picture shall contain only one slice and the value of sh_picture_header_in_slice_header_flag in each slice shall be equal to 1. pic_header_in_slice_header_constraint_flag equal to 0 does not impose such a constraint.

one_slice_per_pic_constraint_flag equal to 1 specifies that each picture shall contain only one slice. one_slice_per_pic_constraint_flag equal to 0 does not impose such a constraint. When pic_header_in_slice_header_constraint_flag is equal to 1, the value of one_slice_per_pic_constraint_flag shall be equal to 1.

one_subpic_per_pic_constraint_flag equal to 1 specifies that each picture shall contain only one subpicture and the value of sps_subpic_info_present_flag shall be equal to 0. one_subpic_per_pic_constraint_flag equal to 0 does not impose such a constraint. When one_slice_per_pic_constraint_flag is equal to 1, the value of one_subpic_per_pic_constraint_flag shall be equal to 1.

no_qtbtt_dual_tree_intra_constraint_flag equal to 1 specifies that sps_qtbtt_dual_tree_intra_flag shall be equal to 0. no_qtbtt_dual_tree_intra_constraint_flag equal to 0 does not impose such a constraint. When max_chroma_format_constraint_idc is equal to 0, the value of no_qtbtt_dual_tree_intra_constraint_flag shall be equal to 1.

no_partition_constraints_override_constraint_flag equal to 1 specifies that sps_partition_constraints_override_enabled_flag shall be equal to 0. no_partition_constraints_override_constraint_flag equal to 0 does not impose such a constraint.

no_virtual_boundary_constraint_flag equal to 1 specifies that sps_virtual_boundaries_enabled_flag shall be equal to 0. no_virtual_boundary_constraint_flag equal to 0 does not impose such a constraint.

General Prediction Mode Constraint Information Semantics intra_only_constraint_flag equal to 1 specifies that sh_slice_type shall be equal to I. intra_only_constraint_flag equal to 0 does not impose such a constraint. When general_one_picture_only_constraint_flag is equal to 1, the value of intra_only_constraint_flag shall be equal to 1.

no_palette_constraint_flag equal to 1 specifies that sps_palette_enabled_flag shall be equal to 0. no_palette_constraint_flag equal to 0 does not impose such a constraint.

no_ibc_constraint_flag equal to 1 specifies that sps_ibc_enabled_flag shall be equal to 0. no_ibc_constraint_flag equal to 0 does not impose such a constraint.

General Intra Constraint Information Semantics no_mrl_constraint_flag equal to 1 specifies that sps_mrl_enabled_flag shall be equal to 0. no_mrl_constraint_flag equal to 0 does not impose such a constraint.

no_isp_constraint_flag equal to 1 specifies that sps_isp_enabled_flag shall be equal to 0. no_isp_constraint_flag equal to 0 does not impose such a constraint.

no_mip_constraint_flag equal to 1 specifies that sps_mip_enabled_flag shall be equal to 0. no_mip_constraint_flag equal to 0 does not impose such a constraint.

no_cclm_constraint_flag equal to 1 specifies that sps_cclm_enabled_flag shall be equal to 0. no_cclm_constraint_flag equal to 0 does not impose such a constraint. When max_chroma_format_constraint_idc is equal to 0, the value of no_cclm_constraint_flag shall be equal to 1.

General Inter Constraint Information Semantics no_ref_pic_resampling_constraint_flag equal to 1 specifies that sps_ref_pic_resampling_enabled_flag shall be equal to 0. no_ref_pic_resampling_constraint_flag equal to 0 does not impose such a constraint.

no_res_change_in_clvs_constraint_flag equal to 1 specifies that sps_res_change_in_clvs_allowed_flag shall be equal to 0. no_res_change_in_clvs_constraint_flag equal to 0 does not impose such a constraint. When no_rer_pic_resampling_constraint_flag is equal to 1, no_res_change_in_clvs_constraint_flag shall be equal to 1.

no_ref_wraparound_constraint_flag equal to 1 specifies that sps_ref_wraparound_enabled_flag shall be equal to 0. no_ref_wraparound_constraint_flag equal to 0 does not impose such a constraint. When intra_only_constraint_flag is equal to 1, the value of no_ref_wraparound_constraint_flag shall be equal to 1.

no_temporal_mvp_constraint_flag equal to 1 specifies that sps_temporal_mvp_enabled_flag shall be equal to 0. no_temporal_mvp_constraint_flag equal to 0 does not impose such a constraint. When intra_only_constraint_flag is equal to 1, the value of no_temporal_mvp_constraint_flag shall be equal to 1.

no_sbtmvp_constraint_flag equal to 1 specifies that sps_sbtmvp_enabled_flag shall be equal to 0. no_sbtmvp_constraint_flag equal to 0 does not impose such a constraint. When no_temporal_mvp_constraint_flag is equal to 1, the value of no_sbtmvp_constraint_flag shall be equal to 1.

no_amvr_constraint_flag equal to 1 specifies that sps_amvr_enabled_flag shall be equal to 0. no_amvr_constraint_flag equal to 0 does not impose such a constraint. When intra_only_constraint_flag is equal to 1, the value of no_amvr_constraint_flag shall be equal to 1.

no_bdof_constraint_flag equal to 1 specifies that sps_bdof_enabled_flag shall be equal to 0. no_bdof_constraint_flag equal to 0 does not impose such a constraint. When intra_only_constraint_flag is equal to 1, the value of no_bdof_constraint_flag shall be equal to 1.

no_dmvr_constraint_flag equal to 1 specifies that sps_dmvr_enabled_flag shall be equal to 0. no_dmvr_constraint_flag equal to 0 does not impose such a constraint. When intra_only_constraint_flag is equal to 1, the value of no_dmvr_constraint_flag shall be equal to 1 no_affine_motion_constraint_flag equal to 1 specifies that sps_affine_enabled_flag shall be equal to 0. no_affine_motion_constraint_flag equal to 0 does not impose such a constraint. When intra_only_constraint_flag is equal to 1, the value of no_affine_motion_constraint_flag shall be equal to 1.

no_mmvd_constraint_flag equal to 1 specifies that sps_mmvd_enabled_flag shall be equal to 0. no_mmvd_constraint_flag equal to 0 does not impose such a constraint. When intra_only_constraint_flag is equal to 1, the value of no_mmvd_constraint_flag shall be equal to 1.

no_smvd_constraint_flag equal to 1 specifies that sps_smvd_enabled_flag shall be equal to 0. no_smvd_constraint_flag equal to 0 does not impose such a constraint. When intra_only_constraint_flag is equal to 1, the value of no_smvd_constraint_flag shall be equal to 1.

no_prof_constraint_flag equal to 1 specifies that sps_affine_prof_enabled_flag shall be equal to 0. no prof constraint flag equal to 0 does not impose such a constraint. When intra_only_constraint_flag is equal to 1, the value of no_prof_constraint_flag shall be equal to 1.

no_bcw_constraint_flag equal to 1 specifies that sps_bcw_enabled_flag shall be equal to 0. no_bcw_constraint_flag equal to 0 does not impose such a constraint. When intra_only_constraint_flag is equal to 1, the value of no_bcw_constraint_flag shall be equal to 1.

no_ciip_constraint_flag equal to 1 specifies that sps_ciip_enabled_flag shall be equal to 0. no_cipp_constraint_flag equal to 0 does not impose such a constraint. When intra_only_constraint_flag is equal to 1, the value of no_cipp_constraint_flag shall be equal to 1.

no_gpm_constraint_flag equal to 1 specifies that sps_gpm_enabled_flag shall be equal to 0. no_gpm_constraint_flag equal to 0 does not impose such a constraint. When intra_only_constraint_flag is equal to 1, the value of no_gpm_constraint_flag shall be equal to 1.

no_weighted_pred_constraint_flag equal to 1 specifies that sps_weighted_pred_flag shall be equal to 0. no_weighted_pred_constraint_flag equal to 0 does not impose such a constraint.

no_weighted_bipred_constraint_flag equal to 1 specifies that sps_weighted_bipred_flag shall be equal to 0. no_weighted_bipred_constraint_flag equal to 0 does not impose such a constraint.

General Transform Constraint Information Semantics no_mts_constraint_flag equal to 1 specifies that sps_mts_enabled_flag shall be equal to 0. no_mts_constraint_flag equal to 0 does not impose such a constraint.

no_sbt_constraint_flag equal to 1 specifies that sps_sbt_enabled_flag shall be equal to 0. no_sbt_constraint_flag equal to 0 does not impose such a constraint.

no_lfnst_constraint_flag equal to 1 specifies that sps_lfnst_enabled_flag shall be equal to 0. no_lfnst_constraint_flag equal to 0 does not impose such a constraint.

no_transform_skip_constraint_flag equal to 1 specifies that sps_transform_skip_enabled_flag shall be equal to 0. no_transform_skip_constraint_flag equal to 0 does not impose such a constraint.

no_act_constraint_flag equal to 1 specifies that sps_act_enabled_flag shall be equal to 0. no_act_constraint_flag equal to 0 does not impose such a constraint.

no_tsrc_constraint_flag equal to 1 specifies that sh_ts_residual_coding_disabled_flag shall be equal to 1. no_tsrc_constraint_flag equal to 0 does not impose such a constraint. When no_transform_skip_constraint_flag is equal to 1, the value of no_tsrc_constraint_flag shall be equal to 1.

General Quantization Constraint Information Semantics no_joint_cbcr_constraint_flag equal to 1 specifies that sps_joint_cbcr_enabled_flag shall be equal to 0. no_joint_cbcr_constraint_flag equal to 0 does not impose such a constraint. When max_chroma_format_constraint_idc is equal to 0, the value of no_joint_cbcr_constraint_flag shall be equal to 1.

no_bdpcm_constraint_flag equal to 1 specifies that sps_bdpcm_enabled_flag shall be equal to 0. no_bdpcm_constraint_flag equal to 0 does not impose such a constraint. When no_transform_skip_constraint_flag is equal to 1, no_bdpcm_constraint_flag shall be equal to 1.

no_cu_qp_delta_constraint_flag equal to 1 specifies that pps_cu_qp_delta_enabled_flag shall be equal to 0. no_cu_qp_delta_constraint_flag equal to 0 does not impose such a constraint.

no_chroma_qp_offset_constraint_flag equal to 1 specifies that pps_cu_chroma_qp_offset_list_enabled_flag shall be equal to 0. no_chroma_qp_offset_constraint_flag equal to 0 does not impose such a constraint.

no_dep_quant_constraint_flag equal to 1 specifies that sps_dep_quant_enabled_flag shall be equal to 0. no dep quant constraint flag equal to 0 does not impose such a constraint.

no_sign_data_hiding_constraint_flag equal to 1 specifies that sps_sign_data_hiding_enabled_flag shall be equal to 0. no_sign_data_hiding_constraint_flag equal to 0 does not impose such a constraint.

no_explicit_scaling_list_constraint_flag equal to 1 specifies that sps_explicit_scaling_list_enabled_flag shall be equal to 0.

no_explicit_scaling_list_constraint_flag equal to 0 does not impose such a constraint. When no_aps_constraint_flag is equal to 1, the value of no_explicit_scaling_list_constraint_flag shall be equal to 1.

General Loop Filter Constraint Information Semantics no_sao_constraint_flag equal to 1 specifies that sps_sao_enabled_flag shall be equal to 0. no_sao_constraint_flag equal to 0 does not impose such a constraint.

no_alf_constraint_flag equal to 1 specifies that sps_alf_enabled_flag shall be equal to 0. no_alf_constraint_flag equal to 0 does not impose such a constraint.

no_ccalf_constraint_flag equal to 1 specifies that sps_ccalf_enabled_flag shall be equal to 0. no_ccalf_constraint_flag equal to 0 does not impose such a constraint. When max_chroma_format_constraint_idc is equal to 0 or no_alf_constraint_flag is equal 1, the value of no_ccalf_constraint_flag shall be equal to 1 no_ladf_constraint_flag equal to 1 specifies that sps_ladf_enabled_flag shall be equal to 0. no_ladf_constraint_flag equal to 0 does not impose such a constraint.

no_lmcs_constraint_flag equal to 1 specifies that sps_lmcs_enabled_flag shall be equal to 0. no_ lmcs_constraint_flag equal to 0 does not impose such a constraint. When no_aps_constraint_flag is equal to 1, the value of no_lmcs_constraint_flag shall be equal to 1.

General Layer Constraint Information Semantics no_vps_constraint_flag equal to 1 specifies that sps_video_parameter_set_id shall be equal to 0. no_vps_constraint_flag equal to 0 does not impose such a constraint. When general_one_picture_only_constraint_flag is equal to 1, the value of no_vps_constraint_flag shall be equal to 1.

single_layer_constraint_flag equal to 1 specifies that vps_max_layers_minus1 shall be equal to 0. single_layer_constraint_flag equal to 0 does not impose such a constraint. When general_one_picture_only_constraint_flag is equal to 1 or no_vps_constraint_flag is equal to 1, the value of single_layer_constraint_flag shall be equal to 1 all_layers_independent_constraint_flag equal to 1 specifies that vps_all_independent_layers_flag, when present, shall be equal to 1 and, when not present, shall be inferred to be equal to 1. all_layers_independent_constraint_flag equal to 0 does not impose such a constraint.

General Supplemental Enhancement Information Constraint Information Semantics

NOTE 1—Decoders may ignore the value of the general supplemental enhancement information constraint information flags as there are no decoding process requirements associated with the presence or interpretation of the corresponding SEI messages no_scalable_nesting_SEI_constraint_flag equal to 1 specifies that there shall not be any scalable nesting SEI messages present in the bitstream of the OlsInScope. no_scalable_nesting_SEI_constraint_flag equal to 0 does not impose such a constraint.

no_subpic_level_SEI_constraint_flag equal to 1 specifies that there shall not be any subpicture level SEI messages present in the bitstream of the OlsInScope. no_subpic_level_SEI_constraint_flag equal to 0 does not impose such a constraint.

no_filler_payload_SEI_constraint_flag equal to 1 specifies that there shall not be any filler payload SEI messages present in the bitstream of the OlsInScope. no_filler_payload_SEI_constraint_flag equal to 0 does not impose such a constraint.

no_user_data_reg_SEI_constraint_flag equal to 1 specifies that there shall not be any user data registered by Recommendation ITU T.35 SEI messages present in the bitstream of the OlsInScope. no_user_data_reg_SEI_constraint_flag equal to 0 does not impose such a constraint.

no_user_data_unreg_SEI_constraint_flag equal to 1 specifies that there shall not be any user data unregistered SEI messages present in the bitstream of the OlsInScope. no_user_data_unreg_SEI_constraint_flag equal to 0 does not impose such a constraint.

no_film_grain_SEI_constraint_flag equal to 1 specifies that there shall not be any film grain characteristics SEI messages present in the bitstream of the OlsInScope. no_film_grain_SEI_constraint_flag equal to 0 does not impose such a constraint.

general_non_packed_SEI_constraint_flag equal to 1 specifies that there shall not be any frame packing arrangement SEI messages present in the bitstream of the OlsInScope. general_non_packed_SEI_constraint_flag equal to 0 does not impose such a constraint.

NOTE 2—Decoders may ignore the value of general_non_packed_constraint_flag, as there are no decoding process requirements associated with the presence or interpretation of frame packing arrangement SEI messages.

general_non_projected_SEI_constraint_flag equal to 1 specifies that there shall not be any equirectangular projection SEI messages or generalized cubemap projection SEI messages present in the bitstream of the OlsInScope. general_non_projected_SEI_constraint_flag equal to 0 does not impose such a constraint.

NOTE 3—Decoders may ignore the value of general_non_projected_constraint_flag, as there are no decoding process requirements associated with the presence or interpretation of equirectangular projection SEI messages and generalized cubemap projection SEI messages.

no_parameter_set_incl_SEI_constraint_flag equal to 1 specifies that there shall not be any parameter sets inclusion indication SEI messages present in the bitstream of the OlsInScope. no_parameter_set_incl_SEI_constraint_flag equal to 0 does not impose such a constraint.

no_decoded_picture_hash_SEI_constraint_flag equal to 1 specifies that there shall not be any decoded picture hash SEI messages present in the bitstream of the OlsInScope. no_decoded_picture_hash_SEI_constraint_flag equal to 0 does not impose such a constraint.

no_mcdv_SEI_constraint_flag equal to 1 specifies that there shall not be any mastering display colour volume SEI messages present in the bitstream of the OlsInScope. No_mcdv_SEI_constraint_flag equal to 0 does not impose such a constraint.

no_cll_SEI_constraint_flag equal to 1 specifies that there shall not be any content light level SEI messages present in the bitstream of the OlsInScope. no_cll_SEI_constraint_flag equal to 0 does not impose such a constraint.

no_DRAP_SEI_constraint_flag equal to 1 specifies that there shall not be any dependent random access point indication SEI messages present in the bitstream of the OlsInScope. no_DRAP_SEI_constraint_flag equal to 0 does not impose such a constraint.

no_alt_transfer_char_SEI_constraint_flag equal to 1 specifies that there shall not be any alternative transfer characteristics SEI messages present in the bitstream of the OlsInScope. no_alt_transfer_char_SEI_constraint_flag equal to 0 does not impose such a constraint.

no_ambient_view_envir_SEI_constraint_flag equal to 1 specifies that there shall not be any ambient viewing environment SEI messages present in the bitstream of the OlsInScope. no_ambient_view_envir_SEI_constraint_flag equal to 0 does not impose such a constraint.

no_ccv_SEI_constraint_flag equal to 1 specifies that there shall not be any content colour volume SEI messages present in the bitstream of the OlsInScope. no_ccv_SEI_constraint_flag equal to 0 does not impose such a constraint.

no_omni_video_specific_SEI_constraint_flag equal to 1 specifies that there shall not be any omnidirectional video specific SEI messages present in the bitstream of the OlsInScope. no_omni_video_specific_SEI_constraint_flag equal to 0 does not impose such a constraint.

no_field_frame_SEI_constraint_flag equal to 1 specifies that there shall not be any frame-field information SEI messages present in the bitstream of the OlsInScope. no_field_frame_SEI_constraint_flag equal to 0 does not impose such a constraint.

no_sar_SEI_constraint_flag equal to 1 specifies that there shall not be any sample aspect ratio SEI messages present.

Alternative Representations

In an embodiment, instead of representing the general constraint info structure according to Table 1, one may apply the alternative syntax format used in Table 14, where the twelve general_xxx_constraint_info( ) structures, are replaced with corresponding general_xxx_constraint_info syntax elements, where "xxx" describes again an aspect of VVC coding, such as partitioning, intra coding, loop-filtering, and the like.

TABLE 14

Example of alternative general constraint information syntax

|  | Descriptor |
|---|---|
| general_constraint_info( ) { |  |
|   general_format_constraint_info | u(7) |
|   general_functional_constraint_info | u(4) |
|   general_nalu_constraint_info | u(16) |
|   general_partiton_constraint_info | u(6) |
|   general_pred_mode_constraint_info | u(3) |
|   general_intra_constraint_info | u(4) |
|   general_inter_constraint_info | u(16) |
|   general_transform_constraint_info | u(6) |
|   general_quantization_constraint_info | u(7) |
|   general_loop_filter_constraint_info | u(5) |
|   general_layer_constraint_info | u(2) |
|   general_SEI_constraint_info | u(8) |
|   while( !byte_aligned( ) ) |  |
|     gci_alignment_zero_bit | f(1) |
|   gci_num_reserved_bytes | u(8) |
|   for( i = 0; i < gci_num_reserved_bytes; i++ ) |  |
|     gci_reserved_byte[i ] | u(8) |
| } |  |

Table 15 and Table 16 provide examples of syntax and semantics for general_format_constraint_info, which may use 7 bits of total information. It is intended to illustrate how all other general constraint flags syntax and semantics may be specified.

TABLE 15

Example of general format constraint information syntax (variation 1)

| Bit position in general_format_constraint_info | General constraint flag |
|---|---|
| 0 | general_frame_only_constraint_flag |
| 1-3 | max_bitdepth_minus8_constraint_idc |
| 4-5 | max_chroma_format_constraint_idc |
| 6 | no_separate_colour_plane_constraint_flag |
| 7-8 | reserved |

TABLE 16

Example of general format constraint information syntax (variation 2)

| Bit position in general_format_constraint_info | General constraint flag |
|---|---|
| 0 | GeneralFrameOnlyConstraintFlag |
| 1-3 | MaxBitdepthMinus8ConstraintIdc |
| 4-5 | MaxChromaFormatConstraintIdc |
| 6 | NoSeparateColourPlaneConstraintFlag |
| 7-8 | reserved |

In an embodiment, as an example, the semantics for Table 16 may be described as GeneralFrameOnlyConstraintFlag equal to 1 specifies that OlsInScope conveys pictures that represent frames. GeneralFrameOnlyConstraintFlag equal to 0 specifies that OlsInScope conveys pictures that may or may not represent frames. When GeneralFrameOnlyConstraintFlag is equal to 1, the value of sps_field_seq_flag shall be equal to 0.

NOTE—Decoders may ignore the value of general_frame_only_constraint_flag, as there are no decoding process requirements associated with it.

MaxBitdepthMinus8ConstraintIdc specifies that sps_bit_depth_minus8 shall be in the range of 0 to MaxBitdepthMinus8ConstraintIdc, inclusive.

MaxChromaFormatConstraintIdc specifies that sps_chroma_format_idc shall be in the range of 0 to MaxChromaFormatConstraintIdc, inclusive.

NoSeparateColourPlaneConstraintFlag equal to 1 specifies that sps_separate_colour_plane_flag, when present, shall be equal to 0. NoSeparateColourPlaneConstraintFlag equal to 0 does not impose such a constraint.

In another embodiment, instead of representing the general constraint info structure according to Table 1, one may apply the alternative syntax format used in Table 17, where the twelve general_xxx_constraint_info( ) structures, are replaced with corresponding general_xxx_constraint_info_present_flag syntax elements, where "xxx" describes again an aspect of VVC coding, such as partitioning, intra coding, loop-filtering, and the like. Each general_xxx_constraint_info_present_flag conditions signalling of the corresponding general_xxx_constraint_info( ) syntax structure. Conditioning the presence of general_xxx_constraint_info( ) syntax structure on general_xxx_constraint_info_present_flag facilitates parsing (a decoder needs only parse those general_xxx_constraint_info( ) structures for which their corresponding flag is enabled) and provides an additional measure by which to determine that a bit stream is in compliance.

TABLE 17

Example of another embodiment of proposed "General constraint information syntax"

| | Descriptor |
|---|---|
| general_constraint_info( ) { | |
|   general_format_constraint_info_present_flag | u(1) |
|   general_functionality_constraint_info_present_flag | u(1) |
|   general_NALU_constraint_info_present_flag | u(1) |
|   general_partition_constraint_info_present_flag | u(1) |
|   general_pred_mode_constraint_info_present_flag | u(1) |
|   general_intra_constraint_info_present_flag | u(1) |
|   general_inter_constraint_info_present_flag | u(1) |
|   general_transform_constraint_info_present_flag | u(1) |
|   general_quantization_constraint_info_present_flag | u(1) |
|   general_loop_filter_constraint_info_present_flag | u(1) |
|   general_layer_constraint_info_present_flag | u(1) |
|   general_SEI_constraint_info_present_flag | u(1) |
|   gci_reserve_zero_4bits | u(4) |
|   if (general_format_constraint_info_present_flag) | |
|     general_format_constraint_info( ) | |
|   if (general_functionality_constraint_info_present_flag) | |
|     general_fuctionality_constraint_info( ) | |
|   if (general_NALU_constraint_info_present_flag) | |
|     general_NALU_constraint_info( ) | |
|   if (general_partition_constraint_info_present_flag) | |
|     general_partiton_constraint_info( ) | |
|   if (general_pred_mode_constraint_info_present_flag) | |
|     general_pred_mode_constraint_info( ) | |
|   if (general_intra_constraint_info_present_flag) | |
|     general_intra_constraint_info( ) | |
|   if (general_inter_constraint_info_present_flag) | |
|     general_inter_constraint_info( ) | |
|   if (general_transform_constraint_info_present_flag) | |
|     general_transform_constraint_info( ) | |
|   if (general_quantization_constraint_info_present_flag) | |
|     general_quantization_constraint_info( ) | |
|   if (general_loop_filter_constraint_info_present_flag) | |
|     general_loop_filter_constraint_info( ) | |
|   if (general_layer_constraint_info_present_flag) | |
|     general_layer_constraint_info( ) | |
|   if (general_SEI_constraint_info_present_flag) | |
|     general_SEI_constraint_info( ) | |
| } | | general_xxx_constraint_info_present_flag equal to 1 specifies that value of at least one general constraint flag signalled in general_xxx_constraint_info( ) is not equal to 0. general_xxx_constraint_info present flag equal to 0 specifies that the value of all general constraint flags signalled in general_xxx_constraint_info( ) is equal to 0.

In another embodiment, instead of representing the general transform constraint info structure and general quantization constraint info structure according to Tables 9 and 10, respectively, one may apply the alternative syntax format used in Table 18, where general_transform_constraint_info( ) structure and general_quantization_constraint_info( ) in the twelve general_xxx_constraint_info( ) structures, are replaced with a new general_tqr_constraint_info( ) structure, which groups general constraint flags related to transforms, quantization, and residual coding signalled together as a means to reduce confusion about categorizing specific general constraint flags as transform, quantization, or residual coding when there is uncertainty.

TABLE 18

Example of another embodiment for general transform, quantization, and residual constraint information syntax

| | Descriptor |
|---|---|
| general_tqr_constraint_info( ) { | |
|   no_mts_constraint_flag | u(1) |
|   no_sbt_constraint_flag | u(1) |
|   no_lfnst_constraint_flag | u(1) |
|   no_transform_skip_constraint_flag | u(1) |
|   no_act_constraint_flag | u(1) |
|   no_joint_cbcr_constraint_flag | u(1) |
|   no_bdpcm_constraint_flag | u(1) |
|   no_tsrc_constraint_flag | u(1) |
|   no_cu_qp_delta_constraint_flag | u(1) |
|   no_chroma_qp_offset_constraint_flag | u(1) |
|   no_dep_quant_constraint_flag | u(1) |
|   no_sign_data_hiding_constraint_flag | u(1) |
|   *no_explicit_scaling_list_constraint_flag* | *u(1)* |
|   while( !byte_aligned( ) ) | |
|     gci_tqr_alignment_zero_bit | f(1) |
|   gci_tqr_num_reserved_bytes | u(8) |
|   for( i = 0; i < gci_tqr_num_reserved_bytes; i++ ) | |
|     gci_tqr_reserved_byte[i ] | u(8) |
| } | |

In another embodiment, to make future extensions easier, the syntax for reserved bytes (gci_tqr_num_reserved_bytes) can also be expressed as an "extension flag" followed by corresponding extension data which is read when the extension flag is true.

Figure 2A:
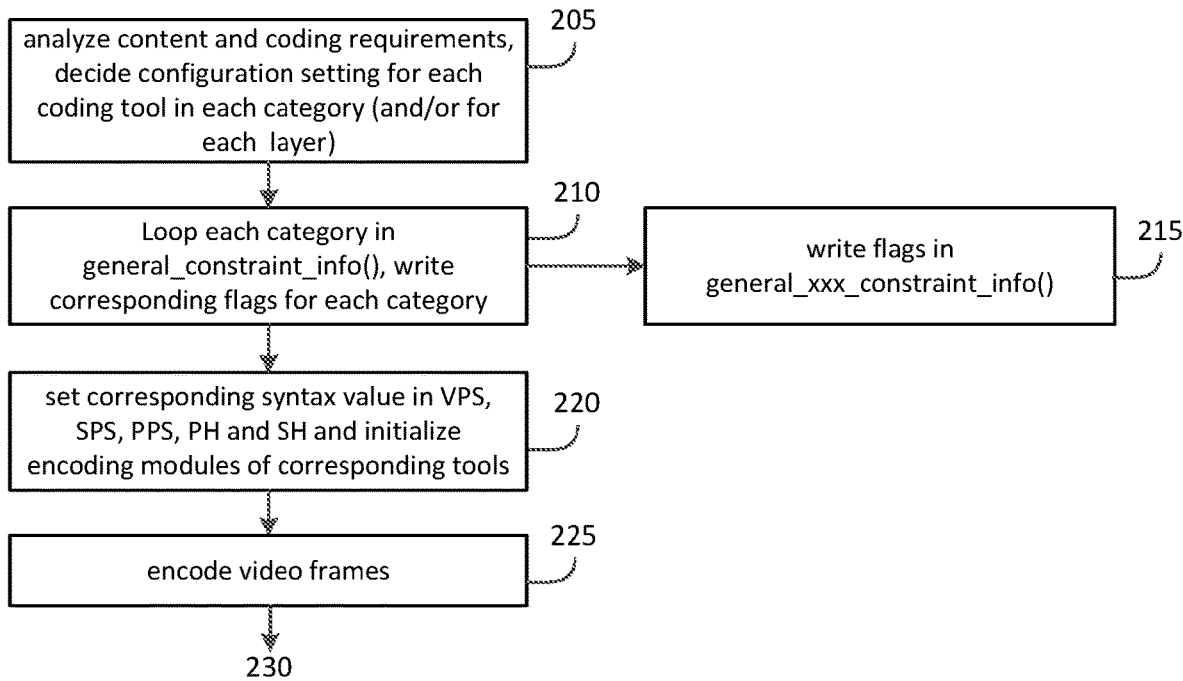
FIG. 2A depicts an example encoding video process according to an embodiment.

FIG. 2A depicts an example process for video encoding according to an embodiment. As depicted in FIG. 2A, in step 205, the encoder analyzes the content and coding requirements (e.g., picture resolution, frame rate, available bandwidth, allowable delay, processing power, etc.) and decides which tools to use and which tools it might skip. In multi-layer coding, these decisions may be made independently for each layer. In steps 210 and 215, for each tool defined earlier, it iterates through all the general_xxx_constraint_info( ) functions defined under general_constraint_info( ), for example, as defined in Table 1, where "xxx" describes a category of related tools and decisions, to specify the specific constraint flags for each tool. Next, in step 220, the encoder sets the corresponding syntax values at the various syntactic layers (e.g., the sequence parameters level (SPS), the picture parameters level (PPS), the picture header (PH), the slice header (SH), and the like). Finally, in step 225, it encodes the incoming video to generate a coded bitstream 230 which is compliant to all the constrained parameters defined earlier (e.g., step 210 and 215). Such a bitstream includes also the general_constraint_info( ) syntax structure for the decoder.

Figure 2B:
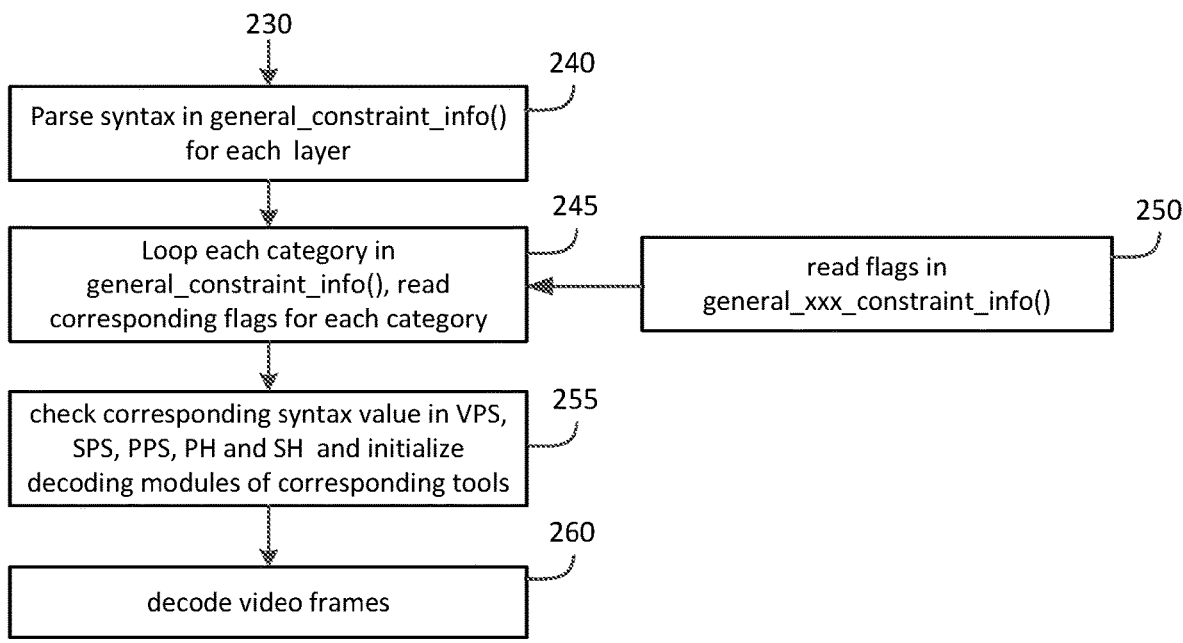
FIG. 2B depicts an example decoding video process according to an embodiment.

Given the encoding process of FIG. 2A, FIG. 2B depicts an example process for video decoding according to an embodiment. Given a coded bitstream 230, in step 240, the decoder parses the bitstream to identify bitstream constraints defined as part of the general_constraint_info( ) syntax structure. In steps 245 and 250, the decoder iterates through all the general_xxx_constraint_info( ) structures defined under general_constraint_info( ), for example, as defined in Table 1, to read all constraint flags for each category "xxx" of encoding tools. In step 255, the parameters extracted earlier may also be used to check conformance by comparing them for consistency with other flags and parameters that are part of the coded bitstream. Finally, in step 260, the coded bitstream is decoded to generate a sequence of video frames.

Example of Constrained Coding and Conformance Testing for Sub-Pictures and Scalability The VVC specification (Ref [2]) defines subpictures as any rectangular region of one or more slices within a picture. In broad terms, subpictures enable separately-coded picture sub-streams or views which can be reassembled by a decoder into a single picture.

In VVC, a slice may be defined in terms of "tiles" and "coding tree units," which, together with some other VVC syntax elements, are described as follows:

A slice is an integer number of complete tiles or an integer number of consecutive complete coding tree units (CTU) rows within a tile of a picture that are exclusively contained in a single network abstraction layer (NAL) unit.

A tile is rectangular region of CTUs within a particular tile column and a particular tile row in a picture.

A tile column is rectangular region of CTUs having a height equal to the height of the picture and a width specified by syntax elements in the picture parameter set.

A tile row is a rectangular region of CTUs having a height specified by syntax elements in the picture parameter set and a width equal to the width of the picture.

A coding block is an M×N block of samples for some values of M and N such that the division of a CTB into coding blocks is a partitioning.

A coding tree block (CTB) is an N×N block of samples for some value of N such that the division of a component into CTBs is a partitioning.

A coding tree unit (CTU) is a CTB of luma samples, two corresponding CTBs of chroma samples of a picture that has three sample arrays, or a CTB of samples of a monochrome picture or a picture that is coded using three separate colour planes and syntax structures used to code the samples.

Scalability

In previous coding standards, such as HEVC, scalability support was defined using different profiles, e.g., a Scalabale Profile. The current version of VVC supports layered scalability in its Main profile. As defined in VVC, a layer includes set of video coding layer (VCL) NAL units that all have a particular value of nuh_layer_id and the associated non-VCL NAL units.

In a recent contribution to the VVC specification (Ref [3]), the authors suggested two profiles for 10-bit, 4:2:0 video support, in version 1 of the VVC specification, to enable the appropriate markets to choose the appropriate profile for their needs:

A "Main 10" profile with subpictures and scalability
A "Constrained Main 10" profile without subpictures and scalability As an example, in an embodiment, to disable subpictures, one may use the existing VVC syntax element one_subpic_per_pic_constraint_flag, defined as:

one_subpic_per_pic_constraint_flag equal to 1 specifies that each picture shall contain only one subpicture. one_subpic_per_pic_constraint_flag equal to 0 does not impose such a constraint. When one_slice_per_pic_constraint_flag is equal to 1, the value of one_subpic_per_pic_constraint_flag shall be equal to 1.

To disable scalable/layered coding, in Ref [3], it was suggested to apply the following constraints in the proposed VVC Constrained Main 10 profile:

The sequence parameter set (SPS) syntax element inter_layer_ref_pics_present_flag shall be equal to 0. This disables inter-layer prediction used for SNR and spatial scalability.

The video parameter set (VPS) syntax element vps_max_layers_minus1 shall be equal to 0. This disables multiple output layer sets so decoders do not have to manage different output layer sets.

A single value of the NAL unit header syntax element nuh_layer_id shall be used across the whole coded video sequence CVS (coded video sequence). This disables more than one picture in each Access Unit (AU).

In an embodiment, by way of example, to disallow scalable or layered coding, instead of creating additional profiles as suggested in Ref. [3], one may achieve similar functionality by using the following general constraint information syntax element:

no_scalability_constraint_flag introduced as part of the syntax elements in Table 3, which, when set to 1, indicates to a decoder that scalable and layered coding is disabled.

In other embodiments, the value of no_scalability_constraint_flag may be conditioned or implied based on the value of the following proposed additional general constraint information syntax elements.

no_vps_constraint_flag (in Ref. [3], related to single_layer_constraint_flag) indicates that VPS is not present no_mols_constraint_flag disables multiple output layer sets so decoders do not have to manage different output layer sets ('mols' for multiple output layer sets) (see also Table 12).

no_mnli_constraint_flag disables more than one picture (more than one layer) in any access unit (AU) ('mnli' for multiple nuh_layer_id). (In Ref. [3], it is referred to as no_mixed_nalu_types_in_pic_constraint_flag)

no_ilrp_constraint_flag disables inter-layer prediction used for SNR and spatial scalability ('ilrp' for inter-layer reference picture). (In Ref. [3], this appears to be equivalent to the all_layers_independent_constraint_flag).

Example definitions of these syntax elements include:
no_vps_constraint_flag equal to 1 specifies the SPS does not refer to a VPS. no_vps_constraint_flag equal to 0 specifies there may be a VPS inside the CVS. When no_vps_constraint_flag equal to 1, then one or more of the following applies:

The value of no_mnli_constraint_flag shall be equal to 1
The value of no_ilrp_constraint_flag shall be equal to 1
The value of sps_video_parameter_set_id shall be equal to 0
The value of vps_max_layers_minus1 is inferred to be equal to 0
The value of each_layer_is_an_ols_flag is inferred to be equal to 1
The value of inter_layer_ref_pics_present_flag is inferred to be equal to 0 no_mols_constraint_flag equal to 1 specifies that the total number of output layer sets (OLSs) specified by the VPS is equal to 1. no_mols_constraint_flag equal to 0 does not impose such a constraint.

When the value of no_mols_constraint_flag is equal to 1, one or more of the following applies:

The value of no_vps_constraint_flag shall be equal to 0
The value of sps_video_parameter_set shall not be equal to 0
When the value of vps_max_layers_minus1 is greater than 0, the value of each_layer_is_an_ols_flag shall be equal to 0 and the value of vps_all_independent_layers_flag shall be 0
When the value of ols_mode_idc is equal to 2, the value of num_output_layer_sets_minus1 shall be equal to 0.

Otherwise, the value of ols_mode_idc is equal to 0 or 1, the value of vps_max_layers_minus1 shall be equal to 0.

no_mnli_constraint_flag equal to 1 specifies that all VCL NAL units in the CVS shall have the same value of nuh_layer_id. no_mnli_constraint equal to 0 does not impose such a constraint.

When the value of no_mnli_constraint is equal to 1, then one or more of the following applies:
The value of vps_max_layers_minus1 shall be equal to 0
The value of each_layer_is_an_ols_flag is inferred to be equal to 1 no_ilrp_constraint_flag equal to 1 specifies that no inter layer reference picture (ILRP) is used for inter prediction of any coded picture in the coded layer video sequence (CLVS). no_ilrp_constraint_flag equal to 0 does not impose such a constraint. When the value of no_ilrp_constraint_flag is equal to 1, one or more of the following applies:
the value of inter_layer_ref_pics_present_flag shall be equal to 0
the value of vps_all_independent_layers_flag shall be equal to 1.

In an embodiment, the variable noScalabilityConstraint, specifying the value of no_scalability_constraint_flag, may be derived as follows:

```
if( no_vps_constraint_flag | | no_mols_constraint_flag | |
no_mnli_constraint_flag | |
    no_ilrp_constraint_flag | |
    vps_max_layers_minus1 == 0 | |
sps_video_parameter_set_id == 0 )
    noScalabilityConstraint = 1
else
    noScalabilityConstraint = 0
``` where x||y denotes a Boolean logical "or" of x and y.

Figure 3:
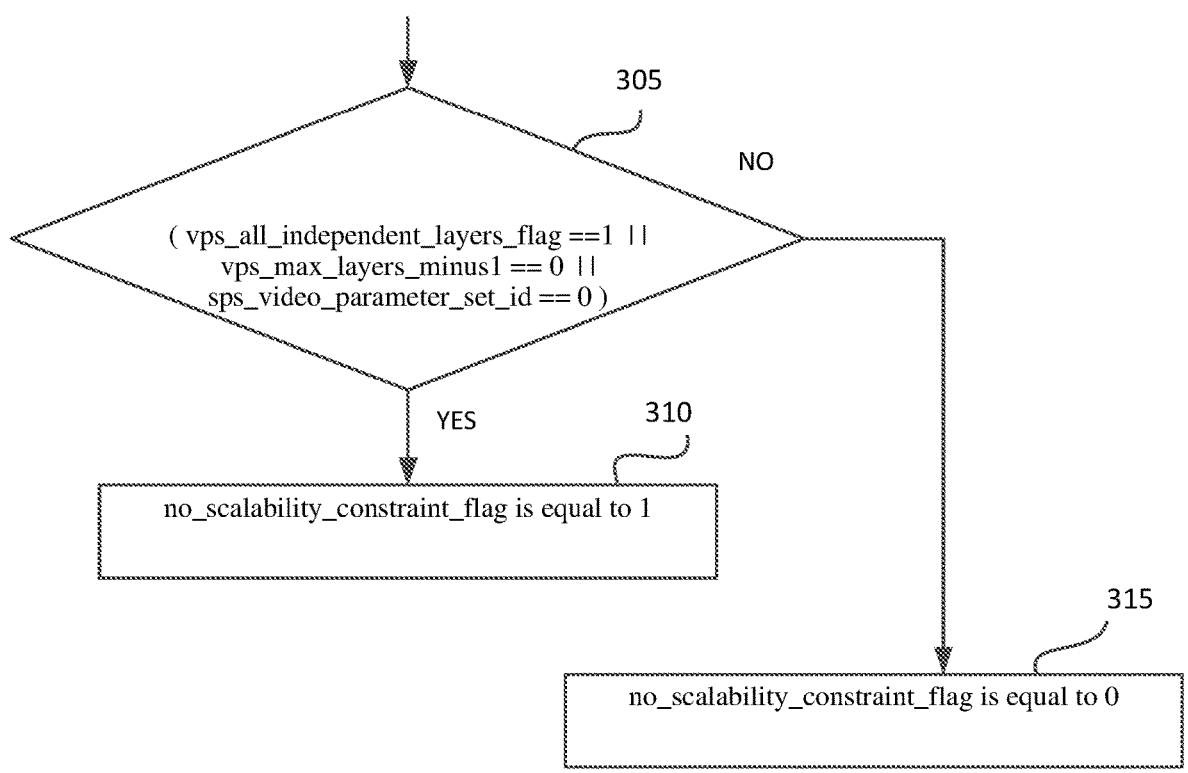
FIG. 3 depicts an example process for constrained layered processing according to an embodiment.

FIG. 3 depicts an example process of determining whether scalability is enabled or disabled in a bitstream. As depicted in FIG. 3, a decoder may perform the logical operations depicted in step 305, same as those defined above, and if it is true, then scalability is disabled (310), else scalability is enabled (315).

A person skilled in the art would appreciate that the proposed new flags may also be applicable to constrain and detect other functionality of the VVC codec, beyond scalability and layered coding. The following examples are provided with no limitation.

In an example, when the no_vps_constraint_flag is equal to 1, the flag may be used to detect one or more of the following conditions of bitstream conformance or constraints:
The value of no_mnli_constraint flag is equal to 1, which specifies that the CVS contains only one layer
The value of no_ilrp_constraint_flag is equal to 1, which specifies that that no inter layer reference picture (ILRP) is used for inter prediction of any coded picture in the CLVS
The value of sps_video_parameter_set_id is equal to 0, which indicates that the SPS does not refer to a VPS, that the value of GeneralLayerIdx[nuh_layer_id] is inferred to be equal to 0, and the value of vps_independent_layer_flag[GeneralLayerIdx[nuh_layer_id]] is inferred to be equal to 1
The value of vps_max_layers_minus1 is inferred to be equal to 0
The value of each_layer_is_an_ols_flag is inferred to be equal to 1
The value of inter_layer_ref_pics_present_flag is inferred to be equal to 0

In another example, when the no_mols_constraint_flag is equal to 1, it can be used to detect one or more of the following:
The value of no_vps_constraint_flag is equal to 0, which specifies that the SPS may refer to the VPS having a value of vps_video_parameter_set_id equal to the value of sps_video_parameter_set_id.

In another example, when the value of the no_mnli_contraints_flag is equal to 0 and the value of no_mols_constraint_flag is equal to 1, then the CVS may contain more than one layer but only one output layer set.

In another example, when constraining that the SPS does not refer to a VPS, one can also detect bitstream conformance by checking whether
no_vps_constraint_flag is 1; checking sps_video_parameter_set_id is 0, and, independently,
no_vps_constraint_flag is 1; no_mnli_constraint_flag is=1.

In another example, when constraining that there is only one OLS, one can detect conformance by checking whether
no_mols_constraint_flag is 1; checking that the no_vps_constraint_flag is 0, and, independently,
no_vps_constraint_flag is 1; sps_video_paramter set not 0.

REFERENCES

Each one of the references listed herein is incorporated by reference in its entirety.

[1] *High efficiency video coding*, H.265, Series H, Coding of moving video, ITU, (02/2018).

[2] B. Bross, J. Chen, S. Liu, and Y-K. Wang "*Versatile Video Coding* (Draft 9)," JVET output document, JVET-R2001, vA (10), JVET 18-th meeting, by teleconference, 15-24 Apr. 2020.

[3] W. Wan et al., "*VVC Version 1 Profiles*," JVET-R0392 (v.6), JVET 18-th Meeting, Apr. 15-24, 2020.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions relating to constrained processing in video coding, such as those described herein. The computer and/or IC may compute any of a variety of parameters or values that relate to constrained processing in video coding described herein. The image and video embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder, or the like may implement methods related to constrained layered processing in video coding as described above by executing software instructions in a program memory accessible to the processors. Embodiments of the invention may also be provided in the form of a program product. The program product may comprise any non-transitory and tangible medium which carries a set of computer-readable signals comprising instructions which, when executed by a data processor, cause the data processor to execute a method of the invention. Program products according to the invention may be in any of a wide variety of non-transitory and tangible forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

EQUIVALENTS, EXTENSIONS, ALTERNATIVES AND MISCELLANEOUS

Example embodiments that relate to constrained processing in video coding are thus described. In the foregoing specification, embodiments of the present invention have been described with reference to numerous specific details that may vary from implementation to implementation. Thus, the sole and exclusive indicator of what is the invention, and what is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

Various aspects of the present invention may be appreciated from the following enumerated example embodiments (EEEs):

EEE 1. A method to decode with a processor a coded video sequence (CVS) with constraint layered processing, the method comprising:
  receiving a coded video sequence (CVS) comprising coded pictures and syntax parameters and detecting whether layered processing is enabled, wherein detecting whether layered processing is enabled comprises, detecting if one or more of the following syntax parameters is set to 1:
  a first flag indicating whether scalability or layered coding is enabled or not;
  a second flag indicating whether a video parameter set (VPS) is constrained or not;
  a third flag indicating whether a total number of output layer sets (OLS) is constrained or not;
  a fourth flag indicating whether a layer to which network abstraction layer (NAL) units belong is constrained or not;
  a fifth flag indicating whether inter-layer prediction is constrained or not; and
  if one or more of these flags is set to 1, then determining that layered processing is disabled, else determining that layered processing is enabled.

EEE 2. The method of EEE 1, wherein if the second flag is set to 1, then:
  the third flag is inferred to be set to 1;
  the fourth flag is inferred to be set to 1;
  the fifth flag is inferred to be set to 1; and
  parameter vps_max_layers_minus1 is inferred to be equal to 0.

EEE 3. The method of EEEs 1 or 2, wherein if the third flag is set to 1, then:
  if the value of ols_mode_idc parameter is equal to 2, then the value of num_output_layer_sets_minus1 shall equal to 0;
  else, if the value of ols_mode_idc is equal to 0 or 1, the value of
  vps_max_layers_minus1 shall be equal to 0.

EEE 4. The method of any of EEEs 1-3, wherein if the fourth flag is set to 1, then it specifies that all video coding layer (VCL) NAL units in the coded video sequence (CVS) shall have the same value of nuh_layer_id, and vps_max_layers_minus1=0.

EEE 5. The method of any of EEEs 1-4, wherein if the fifth flag is set to 1, then it specifies that no inter layer reference picture (ILRP) is used for inter prediction of any coded picture in a coded layer video sequence (CLVS), and inter_layer_ref_pics_present_flag=0.

EEE 6. A method to decode with a processor a coded video sequence (CVS), the method comprising:
  receiving a coded video sequence (CVS) comprising coded pictures and syntax parameters and detecting if one or more of the following syntax parameters is set to 1:
  a first flag indicating whether a video parameter set (VPS) is constrained or not;
  a second flag indicating whether a total number of output layer sets (OLS) is constrained or not;
  a third flag indicating whether a layer to which network abstraction layer (NAL) units belong is constrained or not;
  a fourth flag indicating whether inter-layer prediction is constrained or not; and
  if one or more of these flags is set to 1, then determining bitstream compliance.

EEE 7. The method of EEE 6, wherein if the first flag is detected to be set to 1, then one or more of the following applies:
  the third flag is set to 1;
  the fourth flag is equal to 1;
  sps_video_parameter_set_id=0;
  vps_max_layers_minus1 is inferred to be equal to 0;
  each_layer_is_an_ols_flag is inferred to be equal to 1; or
  inter_layer_ref_pics_present_flag is inferred to be equal to 0.

EEE 8. A method to encode with a processor a sequence of video pictures with constrained processing, the method comprising:
  receiving a sequence of video pictures to be encoded into a coded bitstream;
  determining a set of tools not necessary for decoding the coded bitstream by a decoder;
  determining one or more constraint flags related to the set of tools;

grouping the one or more constraint flags into one or more tool-constraint information syntax structures;

combining the one or more tool-constraint information syntax structures into a general constraint syntax structure; and generating the coded bitstream, wherein the coded bitstream comprises coded pictures of the sequence of video pictures and the general constraint syntax structure.

EEE 9. The method of EEE 8, wherein the one or more tool-constraint information syntax structures comprise syntax elements related to one or more of:
- constraint flags related to network abstraction layer (NAL) units,
- constraint flags related to partitions,
- constraint flags related to prediction modes,
- constraint flags related to intra prediction,
- constraint flags related to inter prediction,
- constraint flags related to transforms,
- constraint flags related to quantization,
- constraint flags related to loop filtering,
- constraint flags related to loop formats,
- constraint flags related to general functionality, or
- constraint flags related to supplemental enhancement information messaging.

EEE 10. The method of EEE 9, wherein the syntax elements related to the constraint flags related to general functionality comprise a no-scalability constraint flag wherein if set equal to 1 specifies that scalable and layered coding are disabled for the coded bitstream.

EEE 11. A method to decode with a processor a coded bitstream with constrained processing, the method comprising:

receiving in a decoder the coded bitstream comprising coded pictures of a sequence of video pictures and a general constraint syntax structure, wherein the general constraint syntax structure comprises syntax elements for a set of tools not necessary for decoding the coded bitstream by the decoder;

parsing the general constraint syntax structure to identify one or more tool-constraint information syntax structures, wherein each tool-constraint information syntax structure comprises one or more constraint flags related to a specific coding tool;

parsing each of the one or more tool-constraint information syntax structures to generate one or more constraint flags related to the set of tools; and decoding the coded pictures in the coded bitstream according to the one or more constraint flags to generate the sequence of video pictures.

EEE 12. The method of EEE 11, wherein the one or more tool-constraint information syntax structures comprise syntax elements related to one or more of:
- constraint flags related to network abstraction layer (NAL) units,
- constraint flags related to partitions,
- constraint flags related to prediction modes,
- constraint flags related to intra prediction,
- constraint flags related to inter prediction,
- constraint flags related to transforms,
- constraint flags related to quantization,
- constraint flags related to loop filtering,
- constraint flags related to loop formats,
- constraint flags related to general functionality, or
- constraint flags related to supplemental enhancement information messaging.

EEE 13. The method of EEE 12, wherein the syntax elements related to the constraint flags related to general functionality comprise a no-scalability constraint flag wherein if set equal to 1 specifies that scalable and layered coding are disabled for the coded bitstream.

EEE 14. A non-transitory computer-readable storage medium having stored thereon computer-executable instructions for executing with one or more processors a method in accordance with any one of the EEEs 1-13.

EEE 15. An apparatus comprising a processor and configured to perform any one of the methods recited in EEEs 1-13.

What is claimed is:

1. A method to encode with a processor a sequence of video pictures with constrained processing, the method comprising:

receiving the sequence of video pictures to be encoded into a coded bitstream;

determining a set of limitations on coding tools and values of syntax elements for the coded bitstream;

determining one or more constraint flags related to the set of limitations;

combining the one or more constraint flags into a general constraint syntax structure that includes a plurality of consecutive constraint syntax portions, wherein the one or more constraint flags include:
a first set comprising a first plurality of consecutive constraint flags related to loop filtering, including a first constraint flag for a constraint on a separate virtual boundaries enabled flag to be set to a specific value indicating no virtual boundaries, that are stored in a first constraint syntax portion in the plurality of consecutive constraint syntax portions of the general constraint syntax structure;

a second set comprising a second plurality of consecutive constraint flags related to transforms and quantization, including a second constraint flag for a constraint on no explicit scaling list, that are stored in a second constraint syntax portion in the plurality of consecutive constraint syntax portions of the general constraint syntax structure;

a third set comprising a third plurality of consecutive constraint flags related to inter coding, including a third constraint flag for a constraint on no weighted prediction, that are stored in a third constraint syntax portion in the plurality of consecutive constraint syntax portions of the general constraint syntax structure; and generating the coded bitstream, wherein the coded bitstream comprises coded pictures of the sequence of video pictures and the general constraint syntax structure.

2. The method of claim 1, wherein a value of 1 to the first constraint flag specifies that sps_virtual_boundaries_enabled_flag shall be equal to 0, otherwise a value of 0 to the first constraint flag does not impose such a constraint.

3. The method of claim 1, wherein a value of 1 to the second constraint flag specifies that sps_explicit_scaling_list_enabled_flag shall be equal to 0, otherwise a value of 0 to the second constraint flag does not impose such a constraint.

4. The method of claim 1, wherein a value of 1 to the third constraint flag specifies that sps_weighted_pred_flag shall be equal to 0, otherwise, a value of 0 to the third constraint flag does not impose such a constraint.

5. A method to decode with a processor a coded bitstream with constrained processing, the method comprising:

receiving in a decoder the coded bitstream comprising coded pictures of a sequence of video pictures and a general constraint syntax structure, wherein the general constraint syntax structure comprises syntax elements on a set of limitations on coding tools and values of syntax elements for the coded bitstream and includes a plurality of consecutive constraint syntax portions;

parsing the general constraint syntax structure to identify one or more constraint flags related to the set of limitations, wherein the one or more constraint flags include:
- a first set comprising a first plurality of consecutive constraint flags related to loop filtering, including a first constraint flag for a constraint on a separate virtual boundaries enabled flag to be set to a specific value indicating no virtual boundaries, that are parsed from a first constraint syntax portion in the plurality of consecutive constraint syntax portions of the general constraint syntax structure;
- a second set comprising a second plurality of consecutive constraint flags related to transforms and quantization, including a second constraint flag for a constraint on no explicit scaling list, that are parsed from a second constraint syntax portion in the plurality of consecutive constraint syntax portions of the general constraint syntax structure;
- a third set comprising a third plurality of consecutive constraint flags related to inter coding, including a third constraint flag for a constraint on no weighted prediction, that are parsed from a third constraint syntax portion in the plurality of consecutive constraint syntax portions of the general constraint syntax structure; and decoding the coded pictures in the coded bitstream according to the one or more constraint flags to generate the sequence of video pictures.

6. The method of claim 5, wherein a value of 1 to the first constraint flag specifies that sps_virtual_boundaries_enabled_flag shall be equal to 0, otherwise a value of 0 to the first constraint flag does not impose such a constraint.

7. The method of claim 5, wherein a value of 1 to the second constraint flag specifies that sps_explicit_scaling_list_enabled_flag shall be equal to 0, otherwise a value of 0 to the second constraint flag does not impose such a constraint.

8. The method of claim 5, wherein a value of 1 to the third constraint flag specifies that sps_weighted_pred_flag shall be equal to 0, otherwise, a value of 0 to the third constraint flag does not impose such a constraint.

9. A non-transitory computer-readable storage medium having stored thereon computer-executable instructions for executing with one or more processors the method of claim 1.

10. An apparatus comprising a processor and configured to perform the method of claim 1.

* * * * *